US012723780B2

(12) United States Patent
Oh et al.

(10) Patent No.: US 12,723,780 B2
(45) Date of Patent: Sep. 1, 2026

(54) HEAT EXCHANGE SYSTEM AND HEAT LOAD CONTROL SYSTEM

(71) Applicant: Seoung Jae Oh, Jeollanam-do (KR)

(72) Inventors: Seoung Jae Oh, Jeollanam-do (KR); Jeong Seok Ha, Gwangju (KR)

(73) Assignee: Seoung Jae Oh, Jeollanam-do (KR)

( * ) Notice: Subject to any disclaimer, the term of this patent is extended or adjusted under 35 U.S.C. 154(b) by 273 days.

(21) Appl. No.: 17/781,849

(22) PCT Filed: Nov. 27, 2020

(86) PCT No.: PCT/KR2020/017128
§ 371 (c)(1),
(2) Date: Jun. 2, 2022

(87) PCT Pub. No.: WO2021/112504
PCT Pub. Date: Jun. 10, 2021

(65) Prior Publication Data

US 2023/0341154 A1 Oct. 26, 2023

(30) Foreign Application Priority Data

Dec. 2, 2019 (KR) ........................ 10-2019-0158464
Jun. 1, 2020 (KR) ........................ 10-2020-0065796

(51) Int. Cl.
*F25B 5/02* (2006.01)
*F17C 9/04* (2006.01)
(Continued)

(52) U.S. Cl.
CPC .................. *F25B 5/02* (2013.01); *F17C 9/04* (2013.01); *F25B 5/04* (2013.01); *F25B 25/005* (2013.01);
(Continued)

(58) Field of Classification Search
CPC .. F25B 5/02; F25B 5/04; F25B 25/005; F25B 41/39; F25B 2400/01; F25B 2400/0411;
(Continued)

(56) References Cited

U.S. PATENT DOCUMENTS 6,250,090 B1 * 6/2001 Mei ........................ F25B 47/02 62/277
2009/0205345 A1 8/2009 Narayanamurthy et al.
(Continued)

FOREIGN PATENT DOCUMENTS

JP 2019-007656 A 1/2019
KR 20-2000-0009743 U 6/2000
(Continued)

OTHER PUBLICATIONS

International Search Report for PCT/KR2020/017128 mailed Mar. 2, 2021 from Korean Intellectual Property Office.

*Primary Examiner* — Tavia Sullens
(74) *Attorney, Agent, or Firm* — Revolution IP, PLLC

(57) ABSTRACT

A heat load control system includes a pump and a compressor for pressurizing a working fluid, a first heat exchanger causing the working fluid to exchange heat with a first medium, a second heat exchanger causing the working fluid to exchange heat with a second medium, an expansion valve and a capillary tube provided between the first heat exchanger and the second heat exchanger to dissipate heat, a heat supplier provided between the first heat exchanger and the second heat exchanger to supply the heat, an adjustment device provided between the first heat exchanger and the second heat exchanger to decrease a temperature, an ice thermal storage provided between the first heat exchanger and the second heat exchanger to supply the heat to the working fluid, and a heater connected to the first heat exchanger to supply heat to the working fluid.

7 Claims, 37 Drawing Sheets

(51) Int. Cl.

| | |
|---|---|
| ***F25B 5/04*** | (2006.01) |
| ***F25B 25/00*** | (2006.01) |
| ***F25B 41/39*** | (2021.01) |

(52) U.S. Cl.
CPC ........ *F25B 41/39* (2021.01); *F17C 2221/033* (2013.01); *F17C 2227/0309* (2013.01); *F25B 2400/01* (2013.01); *F25B 2400/0411* (2013.01)

(58) Field of Classification Search
CPC .. F25B 41/37; F25B 7/00; F25B 40/02; F25B 40/04; F25B 40/06; F17C 9/04; F17C 2221/033; F17C 2227/0309; F28D 20/0034; F28D 20/021
See application file for complete search history.

(56) References Cited

U.S. PATENT DOCUMENTS

| | | | | |
|---|---|---|---|---|
| 2009/0249799 | A1 | 10/2009 | Lee et al. | |
| 2010/0018228 | A1* | 1/2010 | Flammang .............. | F25B 27/02 62/238.7 |
| 2010/0192624 | A1* | 8/2010 | Teraki ................... | F25B 31/006 62/527 |
| 2011/0138849 | A1* | 6/2011 | Hirano ................ | F28D 15/0266 62/513 |

FOREIGN PATENT DOCUMENTS

| | | | |
|---|---|---|---|
| KR | 10-0631352 | B1 | 10/2006 |
| KR | 10-2009-0106681 | A | 10/2009 |
| KR | 10-2010-0121616 | A | 11/2010 |
| KR | 10-2013-0070767 | A | 6/2013 |
| KR | 10-1397621 | B1 | 5/2014 |

* cited by examiner

HEAT EXCHANGE SYSTEM AND HEAT LOAD CONTROL SYSTEM

CROSS REFERENCE TO PRIOR APPLICATIONS

This application is a National Stage Application of PCT International Patent Application No. PCT/KR2020/017128 filed on Nov. 27, 2020, under 35 U.S.C. § 371, which claims priority to Korean Patent Application Nos. 10-2019-0158464 filed on Dec. 2, 2019 and 10-2020-0065796 filed on Jun. 1, 2020 which are all hereby incorporated by reference in their entirety.

TECHNICAL FIELD

The present invention relates to a heat exchange system and a heat load control system.

BACKGROUND

LNG (Liquefied Natural Gas) is obtained by removing nitrogen, carbon dioxide, and impurities from natural gas, which is a gas, for the sake of convenient transportation in overseas gas fields and then liquefying the natural gas at a low temperature and a high pressure, and is composed of methane, propane, butane, and so on. A storage density of LNG is about 430 kg/$m^3$ to about 470 kg/$m^3$, which is 625 times higher than a storage density of a gas in a standard state, and is in a cryogenic liquid state with a temperature of −162° C. LNG is imported from an overseas gas field through an LNG vessel and then unloaded and stored in an LNG storage tank of an LNG terminal. Thereafter, the LNG is vaporized to be transported to a house, but there is a problem in that cold-heat generated during vaporization of LNG may not be used properly.

Meanwhile, a data center refers to a facility that collects equipment required to provide IT services, such as servers, networks, and storage, in one building, operates 24 hours a day and 365 days a year, and manages the equipment in an integrated manner. The servers, networks, and storage devices placed in the data center generate much heat, and since the devices have to maintain an appropriate temperature for normal operation, a device for regulating a temperature of the data center is required. However, the related art only uses a separate energy to control the temperature of the data center, and there is no attempt to use cold-heat generated during the process of vaporization of LNG.

NG (Natural Gas) is vaporized to be transported to homes, and cold-heat generated during vaporization of LNG may be exchanged with waste heat of a factory or a data center.

However, there is a problem in that the amount of cold-heat generated during a vaporization process of LNG is different from the amount of waste heat of a factory, a data center, or so on, and thereby, loads of a heat exchange system are mismatched. The system according to the related art has no technology capable of preventing the mismatch of loads due to a difference in calorific value between two heat sources.

In addition, the related art has no means for supplying or absorbing heat when a system stops in an emergency such as power interruption, and thus, there is a problem in that heat exchange is stopped in an emergency.

SUMMARY OF INVENTION

Technical Problem

The present invention is to solve the problem of the related art described above, and an aspect of the present invention relates to a heat exchange system capable of effectively controlling a heat exchange between a first medium and a second medium by including first and second adjustment means and heat absorption means to adjust a temperature and a pressure of a working fluid.

The present invention is to solve the problem of the related art described above, and one aspect of the present invention relates to a heat load control system capable of absorbing a difference in the amount of heat between cold-heat supplied to a working fluid from a first heat exchanger and heat supplied to the working fluid from a second heat exchanger by using heat dissipation means, heat supply means, adjustment means, an ice thermal storage system, and a heater.

Solution to Problem

A heat exchange system according to the present invention includes a pump or a compressor that pressurizes a working fluid, a first heat exchanger that receives the working fluid from the pump or the compressor causes the working fluid to exchange heat with a first medium to decrease a temperature of the working fluid, first adjustment means for receiving the working fluid from the first heat exchanger and decreasing a temperature and a pressure of the working fluid, heat absorption means for receiving the working fluid from the first adjustment means and absorbing heat to supply the heat to the working fluid, second adjustment means for receiving the working fluid from the heat absorption means and decreasing the temperature and the pressure of the working fluid, and a second heat exchanger that receives the working fluid from the second adjustment means and causes the working fluid to exchange heat with a second medium to increase the temperature of the working fluid and transfers the working fluid to the pump or compressor.

In addition, in the heat exchange system according to the present invention, the first adjustment means includes a first expansion valve that receives the working fluid from the first heat exchanger and decreases the pressure of the working fluid, and a first capillary tube that receives the working fluid from the first expansion valve and decreases a temperature and a pressure of the working fluid.

In addition, in the heat exchange system according to the present invention, the second adjustment means includes a second capillary tube that receives the working fluid from the heat absorption means and decreases a temperature and a pressure of the working fluid, and a second expansion valve that receives the working fluid from the second capillary tube and decreases the pressure of the working fluid.

In addition, the heat exchange system according to the present invention further incudes a first bypass line for transferring the working fluid from the first heat exchanger to the heat absorption means so as to avoid the first adjustment means.

In addition, the heat exchange system according to the present invention further includes a second bypass line for transferring the working fluid from the heat absorption means to the second heat exchanger so as to avoid the second adjustment means.

In addition, in the heat exchange system according to the present invention, the heat absorption means has a fin-pipe structure.

In addition, in the heat exchange system according to the present invention, the heat absorption means includes a plurality of plate portions arranged side by side, each being formed in a flat plate shape, and a tube portion which extends in one direction to penetrate the plurality of plate portions and then is bent and then extends in the other direction to penetrate the plurality of plate portions, and through which the working fluid passes.

In addition, in the heat exchange system according to the present invention, the first medium is liquefied natural gas (LNG), and the first medium absorbs heat while exchanging heat with the working fluid in the first heat exchanger.

In addition, in the heat exchange system according to the present invention, the second medium is internal air of a data center, a large shopping mall, or a refrigeration warehouse, and the second medium dissipates heat while exchanging heat with the working fluid in the second heat exchanger.

In addition, in the heat exchange system according to the present invention, the heat absorption means absorbs heat from the internal air of the data center, the large shopping mall, or the refrigeration warehouse.

In addition, in the heat exchange system according to the present invention, when the internal air of the data center, the large shopping mall, or the refrigeration warehouse includes first internal air at a temperature higher than or equal to the predetermined temperature and the second internal air at a temperature lower than the predetermined temperature, the first internal air exchanges heat with the working fluid in the second heat exchanger, and the second internal air supply heat to the working fluid in the heat absorption means.

A heat load control system according to the present invention includes pressurized means for pressurized a working fluid, a first heat exchanger that causes the working fluid to exchange heat with the first medium and transfers cold-heat of the first medium to the working fluid, the second heat exchanger that causes the working fluid to exchange heat with the second medium and transfers heat of the second medium to the working fluid, heat dissipation means provided between the first heat exchanger and the second heat exchanger to dissipate heat from the working fluid, heat supply means provided between the first heat exchanger and the second heat exchanger to supply heat to the working fluid, adjustment means provided between the first heat exchanger and the second heat exchanger to decrease a temperature and a pressure of the working fluid, an ice thermal storage system provided between the first heat exchanger and the second heat exchanger to supply cold-heat to the working fluid or to absorb the cold-heat from the working fluid, and a heater connected to the first heat exchanger to supply heat to the working fluid.

In addition, in the heat load control system according to the present invention, the adjustment means includes an expansion valve for decreasing the pressure of the working fluid, and a capillary tube for decreasing the temperature and the pressure of the working fluid.

In addition, in the heat load control system according to the present invention, the heat dissipation means or the heat supply means has a fin-pipe structure.

In addition, in the heat load control system according to the present invention, the heat dissipation means or the heat supply means includes a plurality of plate portions arranged side by side, each being formed in a flat plate shape, and a tube which extends in one direction to penetrate the plurality of plate portions and then is bent and then extends in the other direction to penetrate the plurality of plate portions, and through which the working fluid passes.

In addition, in the heat load control system according to the present invention, the heat dissipation means or the heat supply means includes a fan for inducing a forced convection.

In addition, in the heat load control system according to the present invention, the working fluid selectively passes through at least one of the heat dissipation means, the heat supply means, the adjustment means, and the ice thermal storage system.

In addition, in the heat load control system according to the present invention, the first medium is liquefied natural gas (LNG), and the first medium supplies cold-heat to the working fluid in the first heat exchanger.

In addition, in the heat load control system according to the present invention, the second medium is a fluid or seawater that receives heat from waste heat of a factory, waste heat of a garbage disposal site, waste heat of a data center, or waste heat of a shopping mall, and the second medium supplies heat to the working fluid in the second heat exchanger.

In addition, in the heat load control system according to the present invention, the heat dissipation means dissipates heat from the working fluid to atmosphere.

In addition, in the heat load control system according to the present invention, the heat supply means supplies heat from internal heat of a building to the working fluid.

In addition, in the heat load control system according to the present invention, the heater is an electric heater, a gas boiler using BOG (Boil Off Gas), or a heater using waste heat of a data center.

In addition, in the heat load control system according to the present invention, when the amount of cold-heat of the first medium is greater than the amount of heat of the second medium by a first predetermined value, the ice thermal storage system absorbs cold-heat from the working fluid, or the heat supply means supplies heat to the working fluid, and when the second predetermined value is greater than the first predetermined value, in a case where the cold-heat of the first medium is greater than the heat of the second medium by the second predetermined value, the heater supplies heat to the working fluid, and when a third predetermined value is greater than the second predetermined value, in a case where the amount of cold-heat of the first medium is greater than the amount of heat of the second medium by the third predetermined value, the heat supply means supplies heat to the working fluid, and the heater supplies heat to the working fluid, and when a the fourth predetermined value is greater than the third predetermined value, in a case where the amount of cold-heat of the first medium is greater than the amount of heat of the second medium by the fourth predetermined value, the ice thermal storage system absorbs cold-heat from the working fluid, the heat supply means supplies heat to the working fluid, and the heater supplies heat to the working fluid.

In addition, in the heat load control system according to the present invention, when the amount of heat of the second medium is greater than the amount of cold-heat of the first medium by a the fifth predetermined value, the ice thermal storage system supplies cold-heat to the working fluid, or the heat dissipation means dissipates heat from the working fluid, and when the sixth predetermined value is greater than the fifth predetermined value, in a case where the amount of heat of the second medium is greater than the amount of cold-heat of the first medium by the sixth predetermined value, the ice thermal storage system supplies cold-heat to the working fluid, and the heat dissipation means dissipates heat from the working fluid.

In addition, in the heat load control system according to the present invention, a diameter of a tube of the heat supply means through which the working fluid passes is larger than a diameter of a tube of the heat dissipation means through which the working fluid passes.

Features and advantages of the present invention will become more apparent from the following detailed description taken in conjunction with the accompanying drawings.

Prior to this, terms or words used in the present specification and claims should not be construed as usual and dictionary meanings and should be construed as meaning and concept consistent with the technical idea of the present invention, based on a principle that the inventor may adequately define the concept of the terms in order to best describe his/her invention.

Advantageous Effects of Invention

According to the present invention, there is an advantage in that process of heat exchange between the first medium and a second medium may be effectively controlled by adjusting a temperature and a pressure of a working fluid by including the first and the second adjustment means and heat absorption means.

According to the present invention, there is an advantage in that a load of a heat exchange system may be prevent from mismatching due to a difference in the amount of heat by absorbing a difference in the amount of heat between cold-heat of a first medium supplied to a working fluid in the first heat exchanger and heat of the second medium supplied to the working fluid in a second heat exchanger by using heat dissipation means, heat supply means, adjustment means, an ice thermal storage system, a heater, and so on.

In addition, according to the present invention, there is an effect that heat exchange between a working fluid and first and second media may be made in first and second heat exchangers even in an emergency by supplying cold-heat to the working fluid by using an ice thermal storage system in an emergency such as power interruption.

BEST MODE FOR INVENTION

Objects, specific advantages, and novel features of the present invention will become more apparent from the following detailed description and preferred embodiments taken in conjunction with the accompanying drawings. In the present specification, it should be noted that, in attaching reference numbers to components of each drawing, only the same components are given the same number as possible even though the components are illustrated in different drawings. In addition, terms such as "first" and "second" are used to distinguish one component from another component, and the components are not limited by the terms. Hereinafter, in describing the present invention, detailed descriptions of related known technologies that may unnecessarily obscure the subject matter of the present invention will be omitted.

Hereinafter, preferred embodiments of the present invention will be described in detail with reference to the accompanying drawings.

Figure 1:
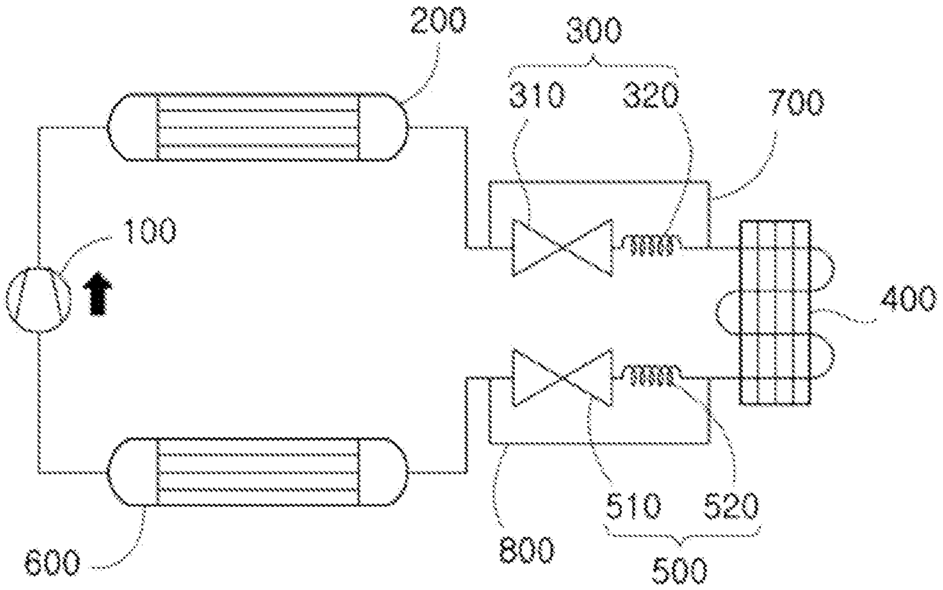
FIG. 1 is a diagram illustrating a heat exchange system according to an embodiment of the present invention.

FIG. 1 is a diagram illustrating a heat exchange system according to an embodiment of the present invention.

As illustrated in FIG. 1, a heat exchange system according to the present embodiment includes a pump or a compressor 100 that pressurizes a working fluid, the first heat exchanger 200 that receives the working fluid from the pump or the compressor 100 and decreases a temperature of the working fluid by heat-changing the working fluid with a first medium, first adjustment means 300 that receives the working fluid from the first heat exchanger 200 and decreases a temperature and a pressure of the working fluid, heat absorption means 400 that receives the working fluid from the first adjustment means 300 and supplies heat to the working fluid absorbing heat, second adjustment means 500 that receives the working fluid from the heat absorption means 400 and decreases the temperature and pressure of the working fluid, and a the second heat exchanger 600 that receives the working fluid from the second adjustment means and increases a temperature of the working fluid by heat-exchanging the working fluid with a second medium and transfers the working fluid to the pump or the compressor 100.

The pump or the compressor 100 serves to increase a pressure by pressurized a working fluid. The pump or the compressor 100 may pressurize the working fluid and transfer the working fluid to the first heat exchanger 200. Accordingly, the working fluid decreases in pressure while passing through the pump or compressor 100. At this time, the working fluid may be in a gaseous state. Meanwhile, the working fluid is not limited in particular, but may be, for example, glycol, propane, ammonia, or so on.

The first heat exchanger 200 serves to exchange heat between the working fluid and a first medium. Specifically, the working fluid is transferred from the pump or the compressor 100 to the first heat exchanger 200, and the first medium is transferred thereto, and the working fluid and the first medium exchange heat with each other. At this time, since a temperature of the first medium is lower than a temperature of the working fluid, the temperature of the working fluid is decreased through the heat exchange. That is, the working fluid emits heat while exchanging heat with the first medium in the first heat exchanger 200. In contrast to this, since the temperature of the working fluid is higher than the temperature of the first medium, the temperature of the first medium is increased through the heat exchange. That is, the first medium absorbs heat while exchanging heat with the working fluid in the first heat exchanger 200. Meanwhile, when the temperature of the first medium increases in the first heat exchanger 200, the first medium may phase-change from a liquid to a gas. For example, the first medium may be liquefied natural gas (LNG) that maintains a pressure of about 70 bar and a temperature of about −163° C. and may phase-change to compressed natural gas (CNG) while increasing in temperature in the first heat exchanger 200.

The first adjustment means 300 receives a working fluid from the first heat exchanger 200 and serves to decrease a temperature and a pressure of the working fluid. Here, the first adjustment means 300 may include the first expansion valve 310 and the first capillary tube 320. Specifically, the first expansion valve 310 receives the working fluid from the first heat exchanger 200 and decreases a pressure of the working fluid. In addition, the first capillary tube 320 receives the working fluid from the first expansion valve 310 and decreases a temperature and a pressure of the working fluid. As a result, the working fluid may be decreased in pressure while passing through the first expansion valve 310 and decreases in temperature and pressure while passing through the first capillary tube 320.

Figure 2:
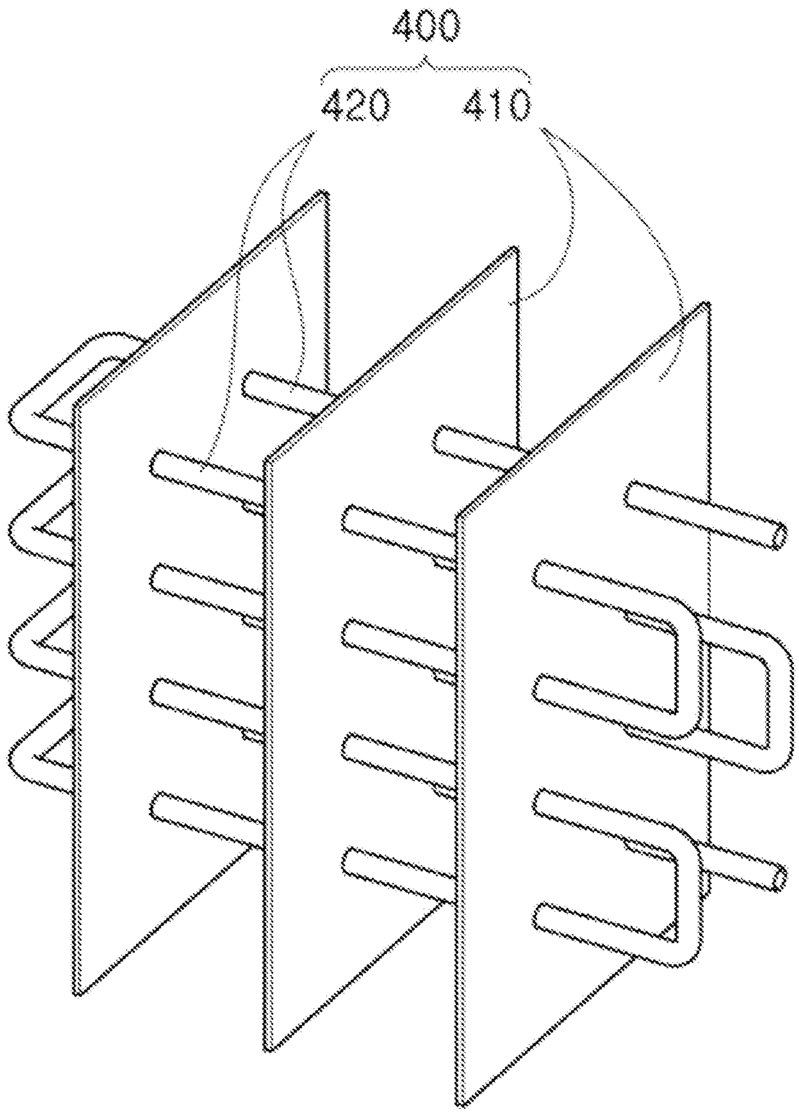
FIG. 2 is a perspective view of heat absorption means of the heat exchange system according to the embodiment of the present invention.

The heat absorption means 400 receives a working fluid from the first adjustment means 300 and serves to supply heat to the working fluid. Here, the heat absorption means 400 absorbs heat from the outside and supplies the heat to the working fluid and may be, for example, a fin-pipe structure. As illustrated in FIG. 2, the heat absorption means

400, which is the fin-pipe structure, may include a plate portion 410 and a tube portion 420. At this time, the plate portion 410 is formed in a flat plate shape, and a plurality of plate portions are arranged side by side. In addition, the tube portion 420 which extends in one direction to penetrate the plurality of plate portions 410 arranged side by side and then is bent and then extends in the other direction to penetrate the plurality of plate portions, and through which the working fluid passes. For example, the tube portion 420 may be formed to penetrate the plurality of plate portions 410 and then be bent and then penetrate the plurality of plate portions 410 again and may be in contact with the plurality of plate portions 410 several times. Accordingly, when the plate portion 410 absorbs external heat, the heat is transferred to the tube portion 420 in contact with the plate portion 410 several times, and the heat is finally transferred to the working fluid passing through the tube portion 420. As a result, the working fluid receives heat while passing through the heat absorption means 400 and increases in temperature. Meanwhile, the heat absorption means 400 may absorb heat from the internal air or so on of the data center and details thereto will be described below.

The second adjustment means 500 (refer to FIG. 1) receives a working fluid from the heat absorption means 400 and serves to decrease a temperature and a pressure of the working fluid. Similarly to the first adjustment means 300, the second adjustment means 500 may include a second expansion valve 510 and a second capillary tube 520. Specifically, the second capillary tube 520 receives the working fluid from the heat absorption means 400 and decreases the temperature and pressure of the working fluid. In addition, the second expansion valve 510 receives the working fluid from the second capillary tube 520 and decreases the pressure of the working fluid. As a result, the working fluid may decrease in temperature and pressure while passing through the second capillary tube 520 and decrease in pressure while passing through the second expansion valve 510.

The second heat exchanger 600 serves to exchange heat between the working fluid and the second medium. Specifically, the second heat exchanger 600 receives the working fluid from the second adjustment means 500 and receives the second medium, and the working fluid and the second medium exchange heat with each other. At this time, since a temperature of the second medium is higher than a temperature of the working fluid, the temperature of the working fluid is increased through heat exchange. That is, the working fluid absorbs heat while exchanging heat with the second medium in the second heat exchanger 600. In contrast to this, since the temperature of the working fluid is lower than the temperature of the second medium, the temperature of the second medium is decreased through the heat exchange. That is, the second medium emits heat while exchanging heat with the working fluid in the second heat exchanger 600. For example, the second medium may be the internal air of a data center. Since a large amount of heat is generated from a server, a network, and a storage in the data center, a temperature of the internal air is relatively high. Accordingly, the internal air (second medium) of the data center may emit heat while exchanging heat with the working fluid in the second heat exchanger 600. As a result, the temperature of the internal air of the data center may be maintained at an appropriate temperature through the process of heat-exchange with the working fluid.

More specifically, in the data center, temperatures of the internal air in each zone may be different from each other. Accordingly, the internal air of the data center may include the first internal air having a temperature equal to or higher than the predetermined temperature and the second internal air having a temperature lower than the predetermined temperature. At this time, the first internal air having a relatively high temperature may exchange heat with the working fluid in the second heat exchanger 600, and the second internal air having a relatively low temperature may supply heat to the working fluid from the heat absorption means 400. Accordingly, the working fluid increases in temperature to a predetermined value by receiving heat from the second internal air having a relatively low temperature in the heat absorption means 400, and then may increase in temperature above a predetermined value by receiving heat from the first internal air having a relatively high temperature in the second heat exchanger 600.

However, the second medium is not limited to the internal air of the data center and may also be the internal air of a large shopping mall, the internal air of a refrigeration warehouse, and so on, which has a large cooling demand.

Overall, the heat exchange system according to the present embodiment may decrease in temperature because the working fluid exchanges heat with a first medium (liquefied natural gas) having a relatively low temperature in the first heat exchanger 200 and may decrease a temperature of a second medium (for example, internal air or so on of a data center) because the working fluid having the decreased temperature exchanges heat with the second medium (for example, internal air or so on of the data center) having a relatively high temperature in the heat exchanger 600. In summary, the second medium (internal air or so on of the data center) by using cold-heat of the first medium (liquefied natural gas).

Additionally, the heat exchange system according to the present embodiment may further include a first bypass line 700 and a second bypass line 800. Here, the first bypass line 700 transfers a working fluid from the first heat exchanger 200 to the heat absorption means 400 so as to avoid the first adjustment means 300. That is, the first bypass line 700 connects between the first heat exchanger 200 and the first adjustment means 300 and between the first adjustment means 300 and the heat absorption means 400, and thereby, the working fluid is transferred from the first heat exchanger 200 to the heat absorption means 400 without passing through the first adjustment means 300. In addition, the second bypass line 800 transfers the working fluid from the heat absorption means 400 to the second heat exchanger 600 so as to avoid the second adjustment means 500. That is, the second bypass line 800 connects between the heat absorption means 400 and the second adjustment means 500 and between the second adjustment means 500 and the second heat exchanger 600, and thereby, the working fluid is transferred from the heat absorption means 400 to the second heat exchanger 600 without passing through the second adjustment means 500. Due to the first bypass line 700 and the second bypass line 800, the working fluid may not selectively pass through the first adjustment means 300 and the second adjustment means 500. For example, when the first bypass line 700 operates, the working fluid may be transferred in the order of the pump or the compressor 100→the first heat exchanger 200→the first bypass line 700→the heat absorption means 400→the second adjustment means 500→the second heat exchanger 600. In addition, when the second bypass line 800 operates, the working fluid may be transferred in the order of the pump or the compressor 100→the first heat exchanger 200→the first adjustment means 300→the heat absorption means 400→the second bypass line 800→the second heat exchanger 600.

Figure 3:
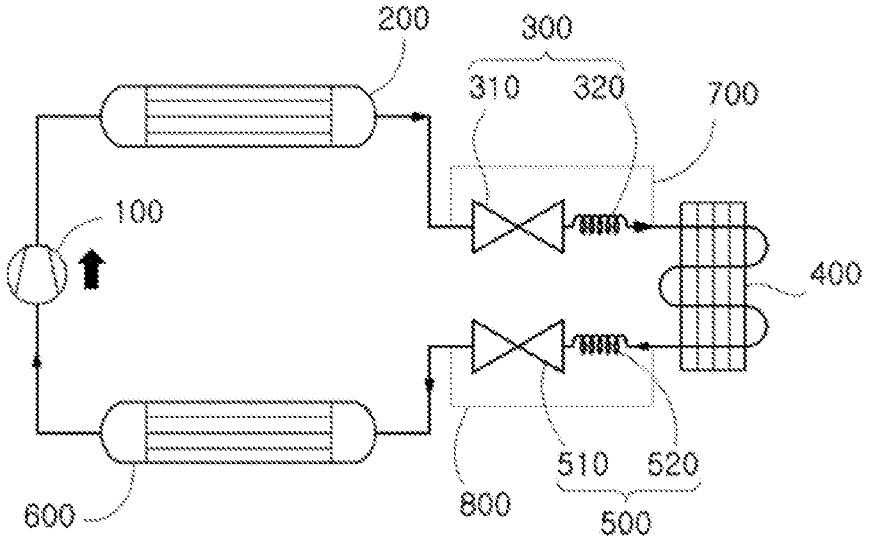
FIG. 3 is a diagram illustrating an operation process of the heat exchange system according to the embodiment of the present invention.
Figure 4:
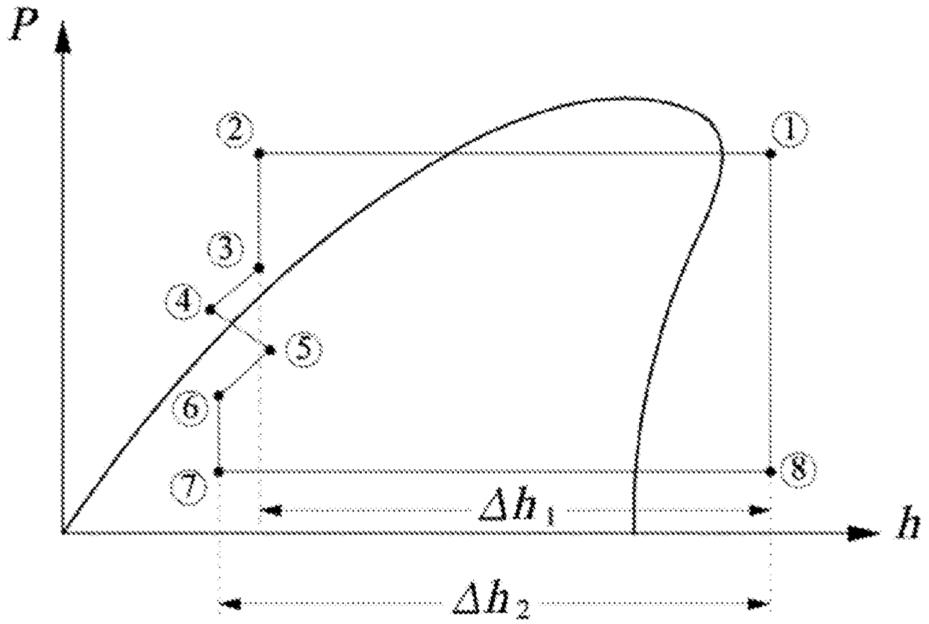
FIG. 4 is a P-h line diagram in the operation process of the heat exchange system according to the embodiment of the present invention.

FIG. 3 is a diagram illustrating an operation process of the heat exchange system according to the embodiment of the present invention, and FIG. 4 is a P-h line diagram illustrating the operation process of the heat exchange system according to the embodiment of the present invention.

A working fluid in a gaseous state increases in pressure while passing through the pump or the compressor 100. At this time, a pressure increases in a P-h line diagram (① in FIG. 4). Next, the working fluid may exchange heat with a first medium while passing through the first heat exchanger 200, thereby decreasing in temperature to be phase-changed to a liquid state (the temperature of the first medium (such as liquefied natural gas) increases). At this time, enthalpy decreases in the P-h line diagram and passes through a saturated vapor line and a saturated liquid line (② in FIG. 4). Next, the working fluid decreases in pressure while passing through the first expansion valve 310. At this time, the pressure decreases in the P-h line diagram (③ in FIG. 4). Next, the working fluid decreases in temperature and pressure while passing through the first capillary tube 320. At this time, the enthalpy decreases in the P-h line diagram and the pressure is decreased (④ in FIG. 4). Next, the working fluid may receive heat while passing through the heat absorption means 400, thereby increasing in temperature to be phase-changed to wet steam (liquid+gas) state. At this time, the enthalpy increases in the P-h line diagram and passes through the saturated liquid line (the pressure may slightly decrease, ⑤ in FIG. 4). Next, the working fluid decreases in temperature and pressure while passing through the second capillary tube 520. At this time, enthalpy is decreased and the pressure decreases in the P-h line diagram (⑥ in FIG. 4). Next, the working fluid decreases in pressure while passing through the second expansion valve 510. At this time, the pressure decreases in the P-h line diagram (⑦ in FIG. 4). Next, the working fluid may exchange heat with a second medium while passing through the second heat exchanger 600, thereby increasing in temperature to be phase-changed to a gaseous state (the temperature of the second medium (internal air and so on of the data center) is decreased). At this time, enthalpy may increase in the P-h line diagram to pass through the saturated steam line (⑧ in FIG. 4). Next, the working fluid increases in pressure while passing through the pump or the compressor 100 again. The heat exchange system according to the present embodiment may operate while repeating the above-described process.

In the heat exchange system according to the present embodiment, the working fluid decreases in temperature and pressure while passing through the first and second capillary tubes 320 and 520, thereby decreasing enthalpy as much as possible before the working fluid passes through the second heat exchanger 600. Accordingly, the working fluid may have a greater amount of heat absorbed by the second heat exchanger 600 compared to the amount of heat emitted from the first heat exchanger 200 (although the working fluid absorbs heat from the heat absorption means 400, the amount of heat absorbed by the second heat exchanger 600 may be greater than the amount of heat emitted from the first heat exchanger 200). It can be confirmed that a difference in enthalpy (Δh2 in FIG. 4) before and after the working fluid passes the second heat exchanger 600 is greater than a difference in enthalpy (Δh1 in FIG. 4) before and after the working fluid passes through the first heat exchanger 200 in the P-h diagram. That is, the heat exchange system according to the present embodiment includes the first and second capillary tubes 320 and 520 to decrease the temperature and pressure of the working fluid, and thus, the amount of heat absorbed by the second heat exchanger 600 may be increased compared to the case in which the first and second capillary tubes 320 and 520 are not provided.

In addition, the heat exchange system according to the present embodiment includes the first and second expansion valves 310 and 510 and the first and second capillary tubes 320 and 520, thereby decreasing a pressure of the working fluid as much as possible before the working fluid passes through the second heat exchanger 600. As described above, the second heat exchanger 600 absorbs heat of a second medium in a state where a pressure of the working fluid is as low as possible, and thus, the efficiency of heat absorption may be increased (because the lower the pressure, the higher the amount of heat absorption per hour).

Figure 5:
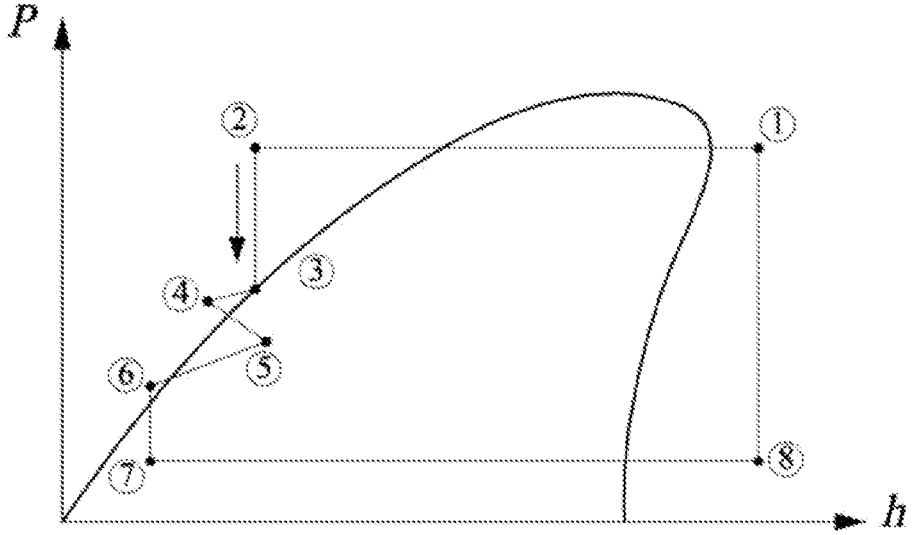
FIG. 5 is a P-h line diagram according to a modification example of the operation process illustrated in FIG. 4.

In addition, the heat exchange system according to the present embodiment includes the first and second adjustment means 300 and 500 and the heat absorption means 400, and thus, an operation region of a working fluid may be selected. For example, as illustrated in FIG. 5, when the working fluid decreases in pressure by more than a predetermined value while passing through the first expansion valve 310, the working fluid may be in a saturated liquid or wet steam (liquid+gas) state. That is, the pressure may meet the saturated liquid line while decreasing in the P-h line diagram (③ in FIG. 5).

As a result, depending on the degree of decrease in pressure of the working fluid generated while passing through the first expansion valve 310, the working fluid may operate in a liquid state (a pressure is decreased to a predetermined value, ③ in FIG. 4) or in a saturation liquid or wet steam (liquid+gas) state (a pressure is decreased by more than a predetermined value, ③ in FIG. 5) in the operation region.

In detail, according to the amount of heat of a working fluid emitted from the first heat exchanger 200, the working fluid may be in a liquid state or wet steam (liquid+gas) state, and by adjusting a decrease in pressure generated by the first and second expansion valves 310 and 510, or by adjusting lengths or diameters of the first and second capillary tubes 320 and 520, an operation region or the type of the working fluid to be used may be selected.

Figure 6:
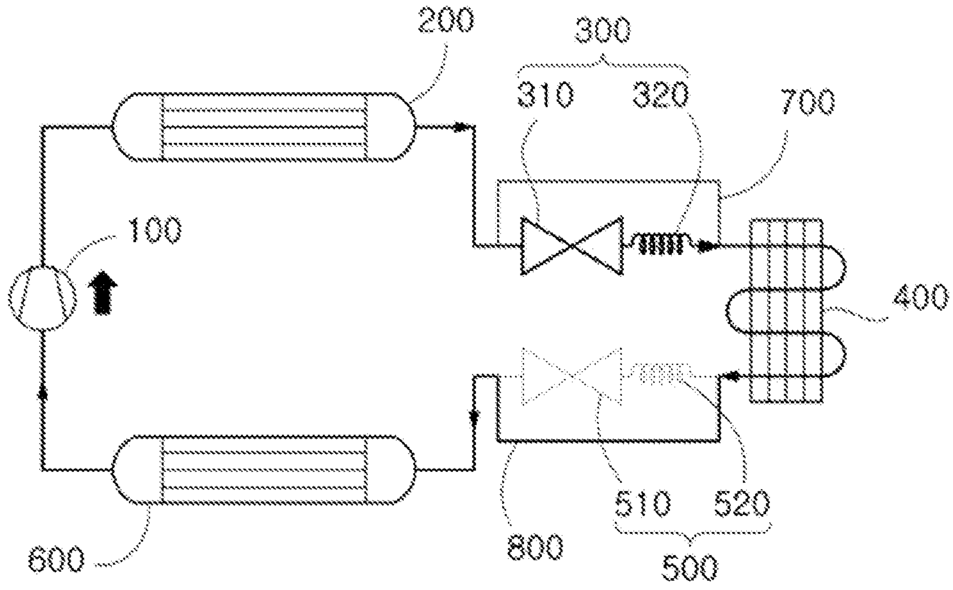
FIG. 6 is a diagram illustrating an operation process when the second bypass line of the heat exchange system according to the embodiment of the present invention operates.
Figure 7:
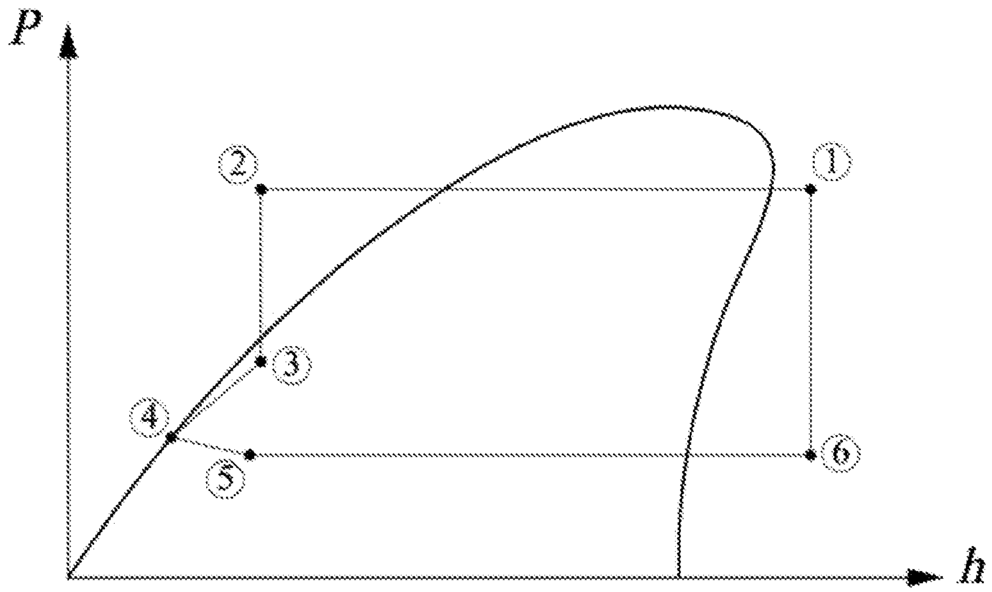
FIG. 7 is a P-h line diagram in the operation process when the second bypass line of the heat exchange system according to the embodiment of the present invention operates.

FIG. 6 is a diagram illustrating an operation process when the second bypass line of the heat exchange system according to the embodiment of the present invention operates, and FIG. 7 is a Ph line diagram in the operation process when the second bypass line of the heat exchange system according to the embodiment of the present invention operates.

A working fluid in a gaseous state increases in pressure while passing through the pump or the compressor 100. At this time, the pressure increases in the P-h line diagram (① in FIG. 7). Next, the working fluid may exchange heat with the first medium while passing through the first heat exchanger 200 and may be decreased in temperature to be phase-changed to a liquid state (the temperature of the first medium (such as liquefied natural gas) increases). At this time, enthalpy decreases in the P-h line diagram and passes through a saturated vapor line and a saturated liquid line (② in FIG. 7). Next, the working fluid decreases in pressure while passing through the first expansion valve 310 and may be phase-changed to a wet steam (liquid+gas) state. At this time, the pressure decreases in the P-h line diagram and passes through the saturated liquid line (③ in FIG. 7). Next, as the working fluid decreases in temperature and pressure while passing through the first capillary tube 320. At this time, the enthalpy decreases and the pressure decreases in the P-h line diagram (④ in FIG. 7). Next, the working fluid receives heat while passing through the heat absorption means 400 to increase in temperature. At this time, the enthalpy increases in the P-h line diagram (⑤ in FIG. 7). Next, the working fluid avoids the second capillary tube 520 and the second expansion valve 510 while passing through the second bypass line 800. Next, the working fluid exchanges heat with a second medium while passing through the second heat exchanger 600 and increases in temperature to be phase-changed to a gaseous state (the temperature of the second medium (internal air or so on of a data center) decreases). At this time, the enthalpy increases in the P-h line diagram and may pass through the saturated steam line (⑥ in FIG. 7). Next, the working fluid increases in pressure while passing through the pump or the compressor 100 again. The heat exchange system according to the present embodiment may operate while repeating the above-described process.

Figure 8:
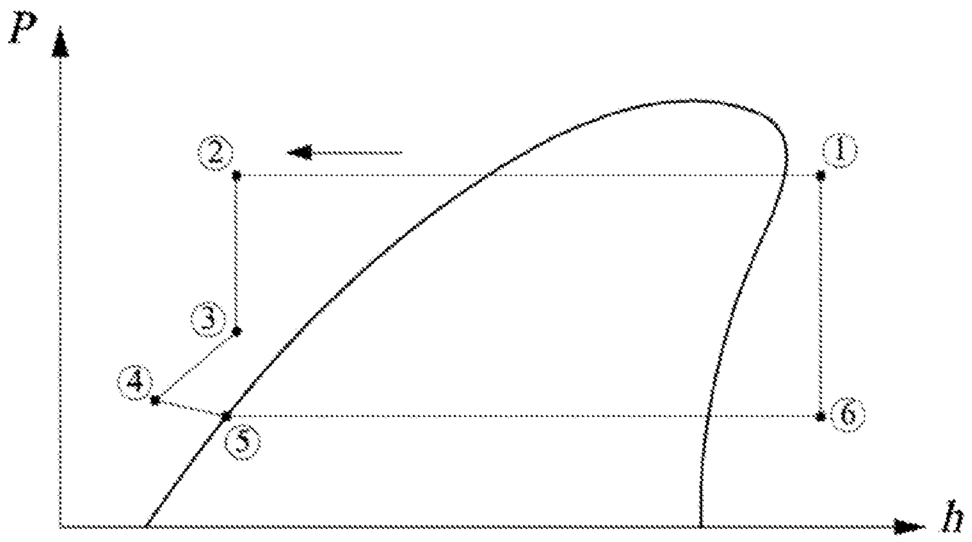
FIG. 8 is a P-h line diagram according to a modification example of the operation process illustrated in FIG. 7.

In addition, as illustrated in FIG. 8, in the heat exchange system according to the present embodiment, a working fluid may exchange heat with a first medium while passing through the first heat exchanger 200 and may decrease in temperature by more than a predetermined value to be phase-changed to a liquid state (the temperature of the first medium (liquefied natural gas or so on) increases). At this time, enthalpy decreases in the P-h line diagram and passes through a saturated vapor line and a saturated liquid line (② in FIG. 8). In this case, the enthalpy decreases very much in the P-h line diagram and is separated from the saturated liquid line by a predetermined distance or more (more heat is emitted than in FIG. 7). Accordingly, thereafter, a process in which the working fluid decreases in pressure while passing through the first expansion valve 310 (③ in FIG. 8), a process in which working fluid decreases in temperature and pressure while passing through the first capillary tube 320 (④ in FIG. 8), and a process in which working fluid receives heat while passing through the heat absorption means 400 and increases in temperature (⑤ in FIG. 8) may be performed in a supercooling region (liquid state).

In this case, since the area in which the working fluid operates in the liquid state is increased, the overall heat exchange system may be adjusted or the working fluid may be selected to correspond thereto. For example, propane capable of operating in the supercooling region may be used as the working fluid.

Figure 9:
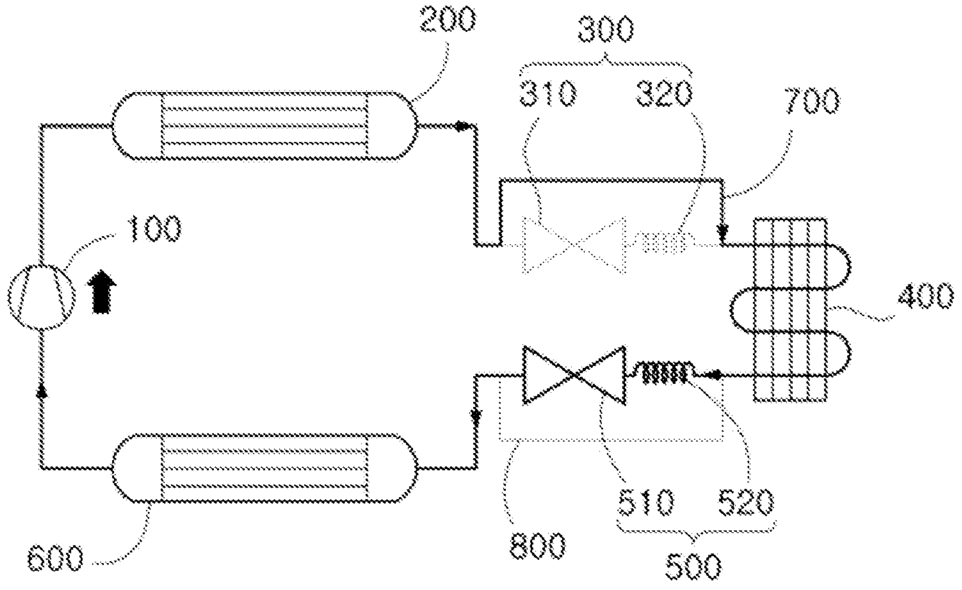
FIG. 9 is a diagram illustrating an operation process when the first bypass line of the heat exchange system according to the embodiment of the present invention operates.
Figure 10:
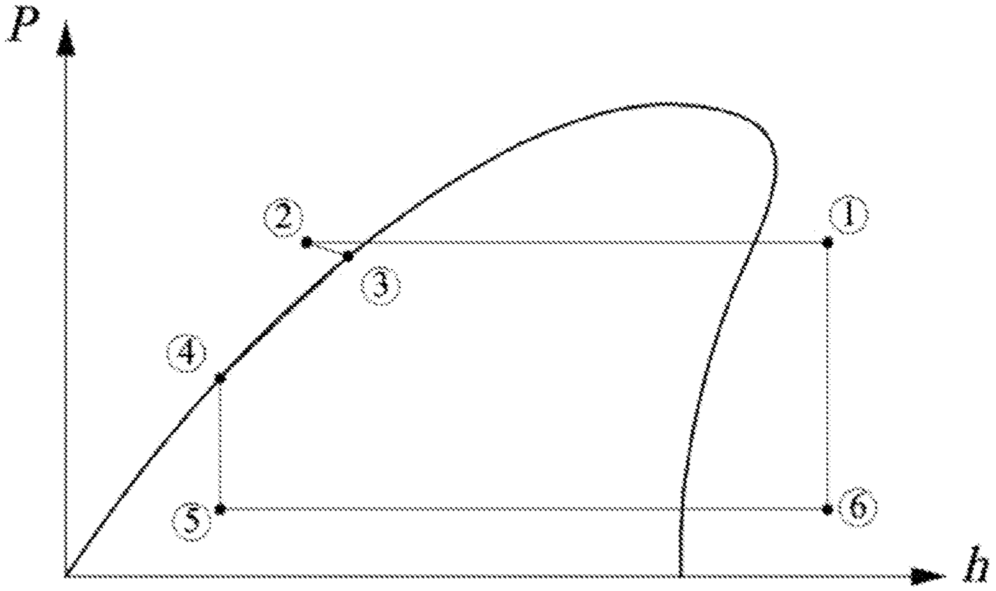
FIG. 10 is a P-h line diagram in an operation process when the first bypass line of the heat exchange system according to the embodiment of the present invention operates.

FIG. 9 is a diagram illustrating an operation process when a first bypass line of the heat exchange system according to the embodiment of the present invention operates, and FIG. 10 is a P-h line diagram in the operation process when the first bypass line of the heat exchange system according to the embodiment of the present invention operates.

A working fluid in a gaseous state increases in pressure while passing through the pump or the compressor 100. At this time, the pressure increases in the P-h line diagram (① in FIG. 10). Next, the working fluid exchanges heat with a first medium while passing through the first heat exchanger 200 and increases in temperature to be phase-changed to a liquid state (the temperature of the first medium (such as liquefied natural gas) increases). At this time, enthalpy decreases in the P-h line diagram and passes through a saturated vapor line and a saturated liquid line (② in FIG. 10). Next, the working fluid avoids the first capillary tube 320 and the first expansion valve 310 while passing through the first bypass line 700. Next, the working fluid receives heat while passing through the heat absorption means 400 and increases in temperature to be phase-changed to wet steam (liquid+gas) state. At this time, the enthalpy increases in the P-h line diagram and passes through the saturated liquid line (a pressure may slightly decrease, ③ in FIG. 10). Next, the working fluid decreases in temperature and pressure while passing through the second capillary tube 520. At this time, the enthalpy decreases in the P-h line diagram and the pressure decreases (④ in FIG. 10). Next, the working fluid decreases in pressure while passing through the second expansion valve 510. At this time, the pressure decreases in the P-h line diagram (⑤ in FIG. 10). Next, the working fluid exchanges heat with a second medium while passing through the second heat exchanger 600 and increases in temperature to be phase-changed to a gaseous state (the temperature of the second medium (internal air or so on of a data center) decreases). At this time, the enthalpy may increase in the P-h line diagram and pass through a saturated steam line (⑥ in FIG. 10). Next, the working fluid increases in pressure while passing through the pump or the compressor 100 again. The heat exchange system according to the present embodiment may operate while repeating the above-described process.

In this case, a region in which the working fluid operates in a liquid state may be minimized, and a region in which the working fluid operates in a wet steam (liquid+gas) state may be increased because the size of the P-h diagram below is wider.

Figure 11:
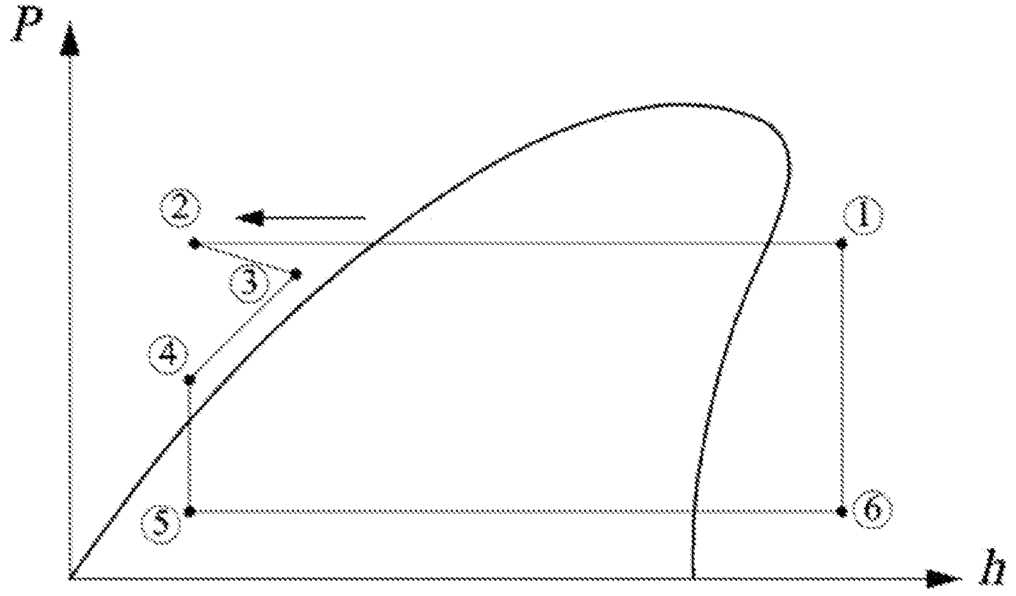
FIG. 11 is a P-h line diagram according to a modification example of the operation process illustrated in FIG. 10.

In addition, as illustrated in FIG. 11, in the heat exchange system according to the present embodiment, the working fluid exchanges heat with the first medium while passing through the first heat exchanger 200 and decreases in temperature by a predetermined value or more to be phase-changed to a liquid state (the temperature of the first medium (liquefied natural gas or so on) increases). At this time, enthalpy decreases in the P-h line diagram and passes through a saturated vapor line and a saturated liquid line (② in FIG. 11). In this case, the enthalpy decreases very much in the P-h line diagram to be separated from the saturated liquid line by a predetermined distance or more (more heat is emitted than in FIG. 10). Accordingly, thereafter, a process in which the working fluid receives heat while passing through the heat absorption means 400 and increases in temperature (③ in FIG. 11), a process in which the working fluid decreases in temperature and pressure while passing through the second capillary tube 520 (④ in FIG. 11), and part of a process in which the working fluid decreases in pressure while passing through the second expansion valve 510 (⑤ in FIG. 11) may be performed in the supercooling region (liquid state).

In this case, a region in which the working fluid operates in a liquid state may be maximized, and a region in which the working fluid operates in a wet steam (liquid+gas) state may be reduced.

As a result, according to the amount of heat absorbed by the working fluid in the first heat exchanger 200, the working fluid may be selectively operated in either a wet steam (liquid+gas) state or a liquid state.

Figure 12:
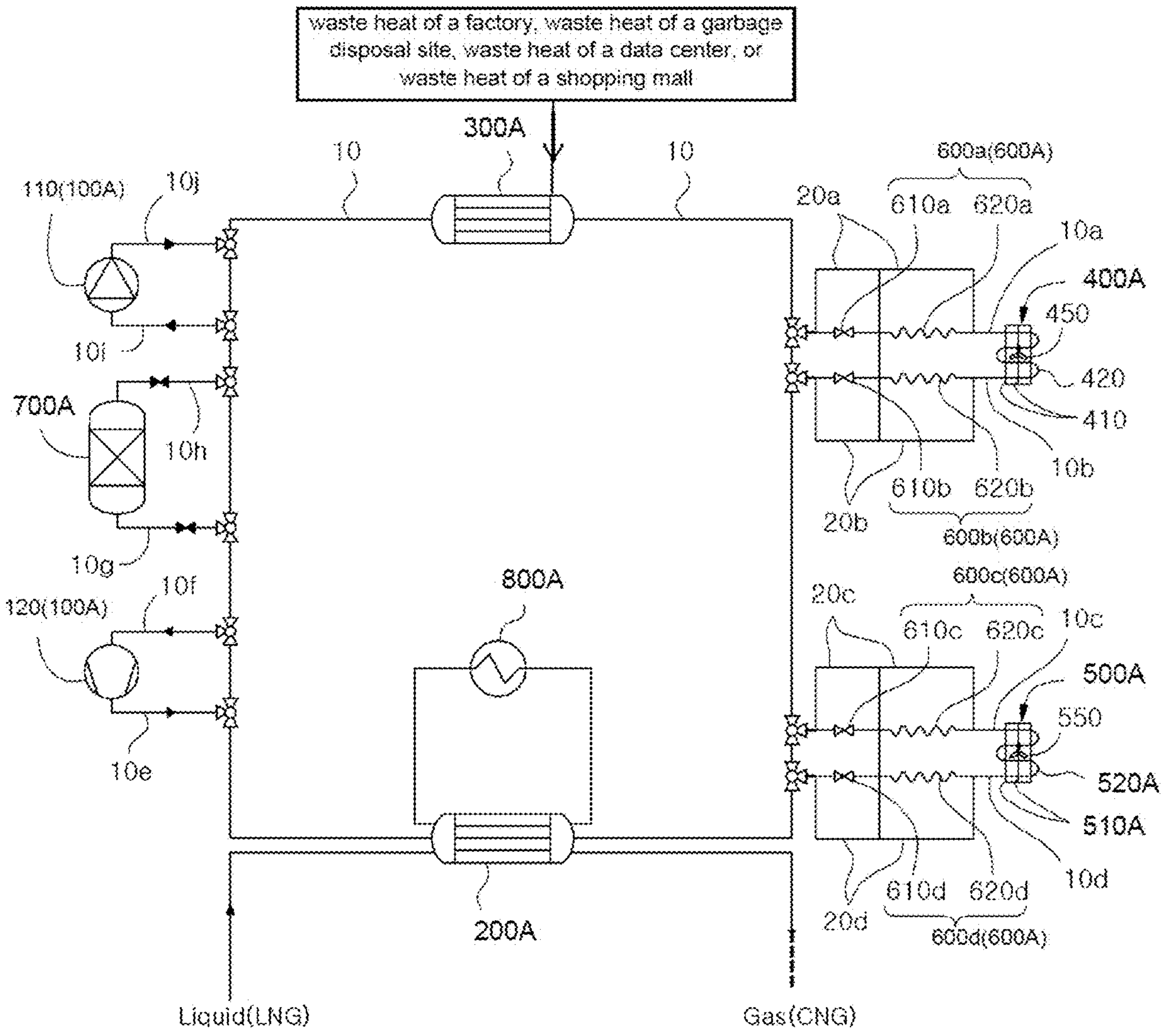
FIG. 12 is a diagram illustrating a heat load control system according to an embodiment of the present invention, FIG. 13 are perspective views of heat dissipation means and heat supply means of the heat load control system according to the embodiment of the present invention.

FIG. 12 is a diagram illustrating a heat load control system according to an embodiment of the present invention.

As illustrated in FIG. 12, the heat load control system according to the present embodiment includes the pressurized means 100A for pressurized a working fluid, the first heat exchanger 200A that transfers cold-heat of a first medium to the working fluid as the working fluid exchanges heat with the first medium, the second heat exchanger 300A that transfers heat of a second medium to the working fluid as the working fluid exchanges heat with the second medium, heat dissipation means 400A provided between the first heat exchanger 200A and the second heat exchanger 300A to dissipate heat from the working fluid, heat supply means 500A provided between the first heat exchanger 200A and the second heat exchanger 300A to supply heat to the working fluid, adjustment means 600A provided between the first heat exchanger 200A and the second heat exchanger 300A to decrease temperature and pressure of the working fluid, an ice thermal storage system 700A provided between the first heat exchanger 200A and the second heat exchanger 300A to supply cold-heat to the working fluid or to absorb cold-heat from the working fluid, and a heater 800A connected to the first heat exchanger 200A to supply heat to the working fluid.

The pressurized means 100A serves to increase a pressure by pressurized a working fluid. That is, the working fluid increases in pressure while passing through the pressurized means 100A. In this case, the working fluid may be in a gaseous state or a liquid state, and the type of the working fluid is not limited in particular, but the working fluid may be, for example, propane, glycol, ammonia, or so on. Meanwhile, the pressurized means 100A is not limited in particular, but may include a pump 110 and a compressor 120. For example, when the working fluid is in a liquid state, the working fluid may be increased in pressure by being pressurized by the pump 110, and when the working fluid is in a gaseous state, the working fluid may be increased in pressure by being pressurized by the compressor 120.

The first heat exchanger 200A serves to exchange heat between a working fluid and a first medium. Specifically, the working fluid and the first medium are transferred to the first heat exchanger 200A, and cold-heat of the first medium is transferred to the working fluid. At this time, since a temperature of the first medium is lower than a temperature of the working fluid, the temperature of the working fluid is decreased through heat exchange. In contrast to this, since the temperature of the working fluid is higher than the temperature of the first medium, the temperature of the first medium is increased through the process of heat exchange. For example, the first medium may be liquefied natural gas (LNG) that maintains a pressure of about 70 bar to about 250 bar and a temperature of about −163° C., and increases in temperature in the first heat exchanger 200A to be phase-changed (evaporated) to compressed natural gas (CNG). As a result, the liquefied natural gas which is the first medium is vaporized in the first heat exchanger 200A and may supply cold-heat to the working fluid.

The second heat exchanger 300A serves to exchange heat between a working fluid and a second medium. Specifically, the working fluid and the second medium are transferred to the second heat exchanger 300A, and heat of the second medium is transferred to the working fluid. At this time, since a temperature of the second medium is higher than a temperature of the working fluid, the temperature of the working fluid is increased through heat exchange. In contrast to this, since the temperature of the working fluid is lower than the temperature of the second medium, the temperature of the second medium is decreased through the process of heat-exchange. For example, the second medium may be a fluid that receives heat from waste heat of a factory, waste heat of a garbage disposal site, waste heat of a data center, or waste heat of a shopping mall. In addition, the second medium may be seawater. The waste heat of the factory, the waste heat of the garbage disposal site, the waste heat of the data center, the waste heat of the shopping mall, the seawater, or so on are relatively hot. As a result, the waste heat of the factory, the waste heat of the waste garbage disposal site, the waste heat of the data center, the waste heat of the shopping mall, the seawater, or so on (the second medium), which have a relatively high temperature, may be decreased in temperature to supply heat to the working fluid.

As a result, in the heat load control system according to the present embodiment, as the cold-heat of the first medium is exchanged with the heat of the second medium through the working fluid, the first medium (liquefied natural gas) increases in temperature to be vaporized, and at the same time, the second medium (a fluid or seawater that receives heat from the waste heat of the factory, the waste heat of the garbage disposal site, the waste heat of the data center, or the waste heat of the shopping mall, etc.). That is, a factory, a garbage disposal site, a data centers, a shopping mall, or seawater related to the second medium may be cooled by using the cold-heat of the first medium (liquefied natural gas), and the first medium (liquefied natural gas) may be vaporized by using the heat of the second medium.

Figure 13:
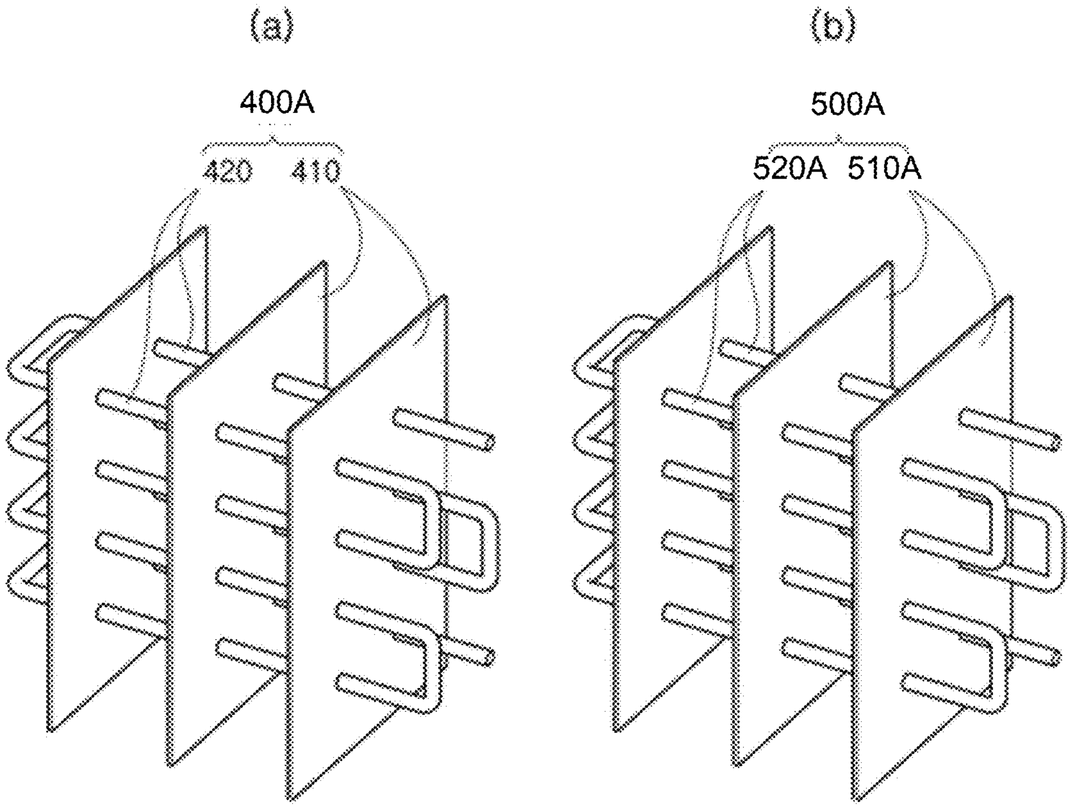

The heat dissipation means 400A serves to dissipate heat from the working fluid. Here, the heat dissipation means 400A absorbs heat from the working fluid and discharges the heat to the outside, and for example, the heat dissipation means 400A may dissipate heat from the working fluid to ambient air. Meanwhile, the heat dissipation means 400A may have a fin-pipe structure. As illustrated in FIG. 13(*a*), the heat dissipation means 400A having the fin-pipe structure may include a plate portion 410 and a tube 420. At this time, the plate portion 410 is formed in a flat plate shape, and a plurality of plate portions are arranged side by side. In addition, the tube 420 which extends in one direction to penetrate the plurality of plate portions 410 arranged side by side and then is bent and then extends in the other direction to penetrate the plurality of plate portions, and through which the working fluid passes. For example, the tube 420 may be formed to penetrate the plurality of plate portions 410 and then be bent and then penetrate the plurality of plate portions 410 again and may be in contact with the plurality of plate portions 410 several times. Accordingly, when heat of the working fluid is dissipated from the tube 420, the heat is transferred to the plate portion 410 in contact with the tube 420 several times, and the heat is finally dissipated to the outside. As a result, the working fluid dissipates heat while passing through the heat dissipation means 400A, thereby being decreased in temperature. Additionally, the heat dissipation means 400A may include a fan 450 that induces a forced convection (see FIG. 12). The fan 450 may forcibly transfer ambient air to increase the efficiency of heat-exchange between the working fluid and ambient air. Here, the heat dissipation means 400A may be used to dissipate heat from the working fluid when the amount of heat of the second medium is greater than the amount of cold-heat of the first medium, and details thereof will be described below.

The heat supply means 500A serves to supply heat to the working fluid. Here, the heat supply means 500A absorbs heat from the outside and supplies the heat to the working fluid, and for example, the heat supply means 500A may supply heat from internal heat of the building to the working fluid. Meanwhile, the heat supply means 500A may have a fin-pipe structure, like the heat dissipation means 400A. As illustrated in FIG. 13(*b*), the heat supply means 500A having the fin-pipe structure may include a plate portion 510A and a tube 520A. Accordingly, when the plate portion 510A absorbs external heat (internal heat of a building), the heat is transferred to the tube 520A in contact with the plate portion 510A several times, and the heat is supplied to the working fluid finally passing through the tube 520A. As a result, the working fluid receives heat while passing through the heat supply means 500A, thereby being increased in temperature. Additionally, the heat supply means 500A may include a fan 550 that induces a forced convection (see FIG. 12). The fan 550 forcibly transfers internal heat of a building to increase the efficiency of heat-exchange between a working fluid and the internal heat of the building. Meanwhile, a diameter of a tube of the heat supply means 500A through which the working fluid passes may be larger than a diameter of a tube of the heat dissipation means 400A through which the working fluid passes. As such, when the diameter of the tube of the heat supply means 500A is relatively large, a heat exchange area is increased to enable the working fluid to efficiently absorb heat. Here, the heat supply means 500A may be used to supply heat to the working fluid when cold-heat of the first medium is greater than heat of the second medium, and details thereof will be described below.

The adjustment means 600A serves to decrease temperature and pressure of the working fluid. Here, the adjustment means 600 may include expansion valves 610*a* to 610*d* and capillary tubes 620*a* to 620*d*. At this time, the expansion valves 610*a* to 610*d* decrease a pressure of the working fluid, and the capillary tubes 620*a* to 620*d* decrease temperature and pressure of the working fluid. Accordingly, the working fluid may decrease in pressure while passing through the expansion valves 610*a* to 610*d* and may decrease in temperature and pressure while passing through the capillary tubes 620*a* to 620*d*.

More specifically, the adjustment means 600A may include first to the fourth adjustment means 600*a* to 600*d*. Here, the first adjustment means 600*a* may include a the first expansion valve 610*a* and the first capillary tube 620*a* provided in a first auxiliary line 10*a* (for example, an inlet side) of the heat dissipation means 400A, and the second adjustment means 600*b* may include the second expansion valve 610*b* and the second capillary tube 620*b* provided in the second auxiliary line 10*b* (for example, an outlet side) of the heat dissipation means 400A. In addition, the third adjustment means 600*c* may include the third expansion valve 610*c* and the third capillary tube 620*c* provided in a third auxiliary line 10*c* (for example, an inlet side) of the heat supply means 500A, and the fourth adjustment means 600*d* may include the fourth expansion valve 610*d* and the fourth capillary tube 620*d* provided in the fourth auxiliary line 10*d* (for example, an outlet side) of the heat supply means 500A. That is, the adjustment means 600A may be provided on the inlet side and the outlet side of the heat dissipation means 400A and on the inlet side and the outlet side of the heat supply means 500A, respectively.

The ice thermal storage system 700A serves to absorb cold-heat from a working fluid or supply the cold-heat to the working fluid.

Here, the ice thermal storage system 700A absorbs cold-heat while changing a liquid phase to a solid phase or supplies cold-heat while changing the solid phase to the liquid phase. That is, the ice thermal storage system 700A may absorb cold-heat from a working fluid while changing the liquid phase to the solid phase and may supply the cold-heat to the working fluid while changing the solid phase to the liquid phase. In contrast to this, the working fluid may decrease in temperature by absorbing cold-heat while passing through the ice thermal storage system 700A or may increase in temperature by supplying cold-heat. Here, the ice thermal storage system 700A may be used to absorb cold-heat from a working fluid when the amount of cold-heat of a first medium is greater than the amount of heat of a second medium or may be used to supply cold-heat to a working fluid when the amount of heat of the second medium is greater than the amount of cold-heat of the second medium, and details thereof will be described below.

The heater 800A serves to supply heat to a working fluid. Here, the heater 800A is connected to the first heat exchanger 200A to supply heat to the working fluid when the working fluid exchanges heat with the first medium while passing through the first heat exchanger 200A. At this time, the working fluid receives heat by the heater 800A, thereby increasing in temperature. Here, the heater 800A is not limited in particular but may be, for example, an electric heater, a gas boiler, or a heater using waste heat of a data center. At this time, the gas boiler may use BOG (Boil Off Gas) of liquefied natural gas (first medium). Here, the heater 800A may be used to supply heat to the working fluid when the amount of cold-heat of the first medium is greater than the amount of heat of the second medium, and details thereof will be described below.

Overall, in the heat load control system according to the present embodiment, when there is a difference in the amount of heat between the cold-heat of the first medium supplied to the working fluid from the first heat exchanger 200A and the heat of the second medium supplied to the working fluid from the second heat exchanger 300A, the difference in the amount of heat is absorbed by using the heat dissipation means 400A, the heat supply means 500A, the adjustment means 600A, the ice thermal storage system 700A, and the heater 800A, and thus, mismatch of a load of the heat exchange system may be prevented from occurring due to the difference in the amount of heat.

Meanwhile, in the heat load control system according to the present embodiment, the working fluid may be transferred through a main line 10 connecting the first heat exchanger 200A to the second heat exchanger 300A and may be transferred to the pressurized means 100A, the heat dissipation means 400A, the heat supply means 500A, the adjustment means 600A, the ice thermal storage system 700A, and so on through the auxiliary lines branched from the main line 10. Here, the auxiliary lines may include first to tenth auxiliary lines 10*a* to 10*j* branched from the main line 10. Specifically, the first and second auxiliary lines 10*a* and 10*b* connect an inlet side and an outlet side of the heat dissipation means 400A to the main line 10, and the third and fourth auxiliary lines 10*c* and 10*d* connect an inlet side and an outlet side of the heat supply means 500A to the main line 10. In addition, the fifth and sixth auxiliary lines 10*e* and 10*f* connect an inlet side and an outlet side of the compressor 120 to the main line 10, the seventh and eighth auxiliary lines 10*g* and 10*h* connect an inlet side and an outlet side of the ice thermal storage system 700A to the main line 10, and the ninth and tenth auxiliary lines 10*i* and 10*j* connect an inlet side and an outlet side of the pump 110 to the main line 10. Additionally, a first bypass line 20*a* for avoiding each of the first expansion valve 610*a* and the first capillary tube 620*a* provided in the first auxiliary line 10*a* may be provided, and a second bypass line 20*b* for avoiding each of the second expansion valve 610*b* and the second capillary tube 620*b* provided in the second auxiliary line 10*b* may be provided. Similarly, a third bypass line 20*c* for avoiding each of the third expansion valve 610*c* and the third capillary tube 620*c* provided in the third auxiliary line 10*c* may be provided, and a fourth bypass line 20*d* for avoiding each of the fourth expansion valve 610*d* and the fourth capillary tube 620*d* provided in the fourth auxiliary line 10*d* may be provided.

As described above, since the heat load system according to the present embodiment includes the first to tenth auxiliary lines 10*a* to 10*j* and the first to fourth bypass lines 20*a* to 20*d*, a working fluid may selectively pass through at least one of the heat dissipation means 400A, the heat supply means 500A, the adjustment means 600A (the first to fourth expansion valves 610*a* to 610*d* and the first to fourth capillary tubes 620$a$ to 602$d$), the ice thermal storage system 700A, the pressurized means 100A, the pump 110, and the compressor 120. That is, the working fluid may selectively pass through at least one of the heat dissipation means 400A, the heat supply means 500A, the adjustment means 600A (the first to fourth expansion valves 610$a$ to 610$d$ and the first to fourth capillary tubes 620$a$ to 602$d$), the ice thermal storage system 700A, and the pressurized means 100A (the pump 110 and the compressor 120) as needed, and may avoid the rest. As a result, the working fluid may selectively pass through only certain configurations.

Figure 14:
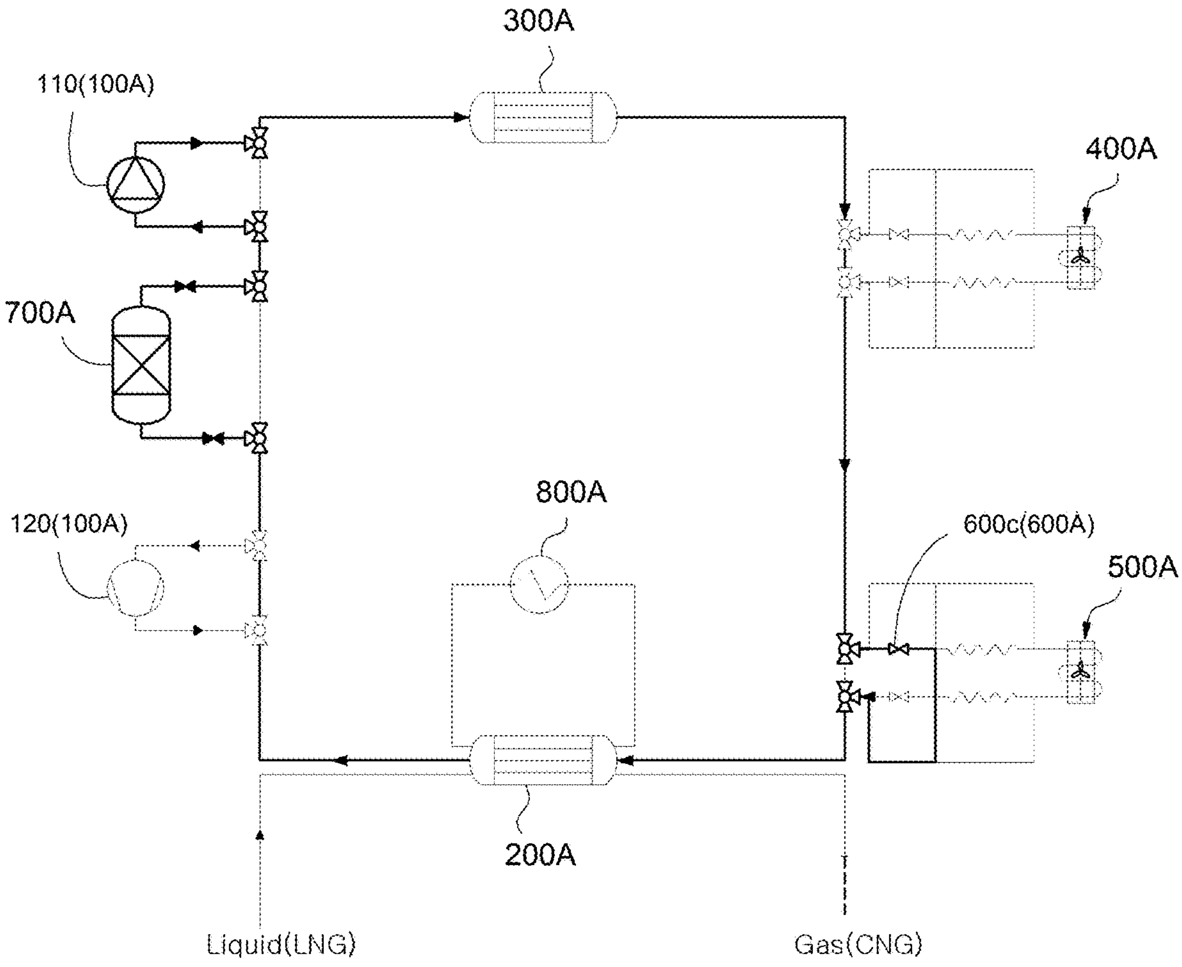
FIG. 14 is a diagram illustrating an operation process of the heat load control system according to the embodiment of the present invention when the amount of cold-heat of a first medium is greater than the amount of heat of a second medium by a first predetermined value.
Figure 15:
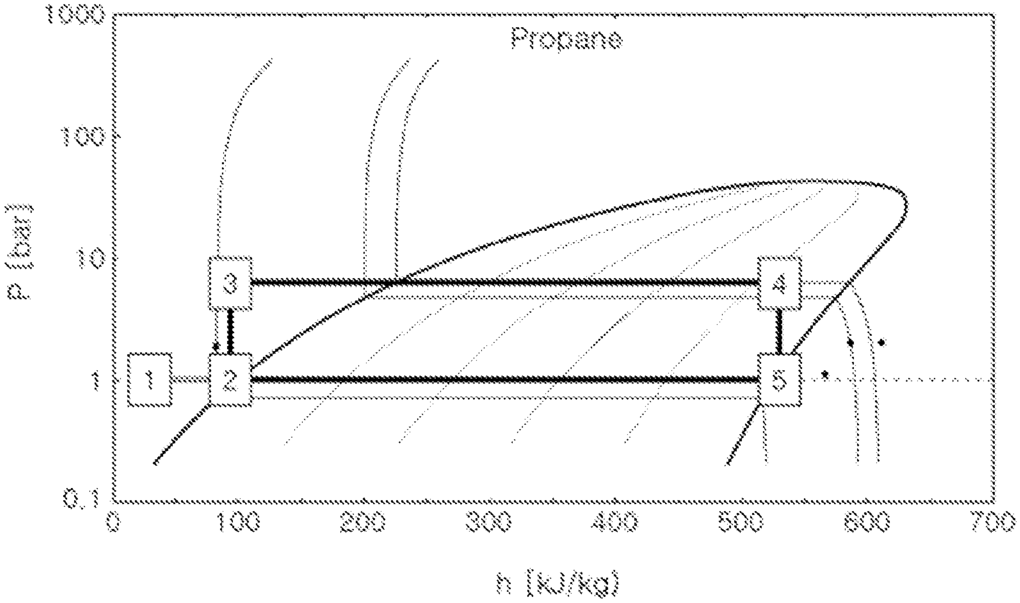
FIG. 15 is a P-h line diagram in the operation process of the heat load control system illustrated in FIG. 14.

FIG. 14 is a diagram illustrating an operation process of the heat load control system according to the embodiment of the present invention when the amount of cold-heat of a first medium is greater than the amount of heat of a second medium by a first predetermined value, and FIG. 15 is a P-h line diagram of the operation process of the heat load control system illustrated in FIG. 14.

A working fluid receives cold-heat from a first medium while passing through the first heat exchanger 200A, thereby decreasing in temperature (the temperature of the first medium increases). At this time, the enthalpy decreases in the P-h line diagram and passes through a saturated liquid line (1 in FIG. 15). Thereafter, the working fluid absorbs cold-heat while passing through the ice thermal storage system 700A, thereby increasing in temperature. At this time, the enthalpy increases in the P-h line diagram and moves in a direction of a saturated liquid line (2 in FIG. 15). Thereafter, the working fluid increases in pressure while passing through the pressurized means 100A (the pump 110). At this time, the pressure increases in the P-h line diagram (3 in FIG. 15). Thereafter, the working fluid receives heat from a second medium while passing through the second heat exchanger 300A, thereby increasing in temperature (the temperature of the second medium decreases). At this time, enthalpy increases in the P-h line diagram and passes through the saturated liquid line (4 in FIG. 15). Thereafter, the working fluid decreases in pressure while passing through the expansion valve 610$c$ of the adjustment means 600A. At this time, the pressure decreases in the P-h line diagram (5 in FIG. 15). Thereafter, the working fluid repeats the above-described process.

In the above-described process, when the amount of cold-heat of a first medium is greater than the amount of heat of a second medium by a first predetermined value, the ice thermal storage system 700A absorbs (ice thermal storage) cold-heat from a working fluid to balance the amount of cold-heat of the first medium and the amount of heat of the second medium. That is, when the amount of cold-heat of the first medium is greater than the amount of heat of the second medium by a relatively small amount (a first predetermined value), the ice thermal storage system 700A may absorb cold-heat, thereby balancing the amount of cold-heat of the first medium and the amount of heat of the second medium.

Figure 16:
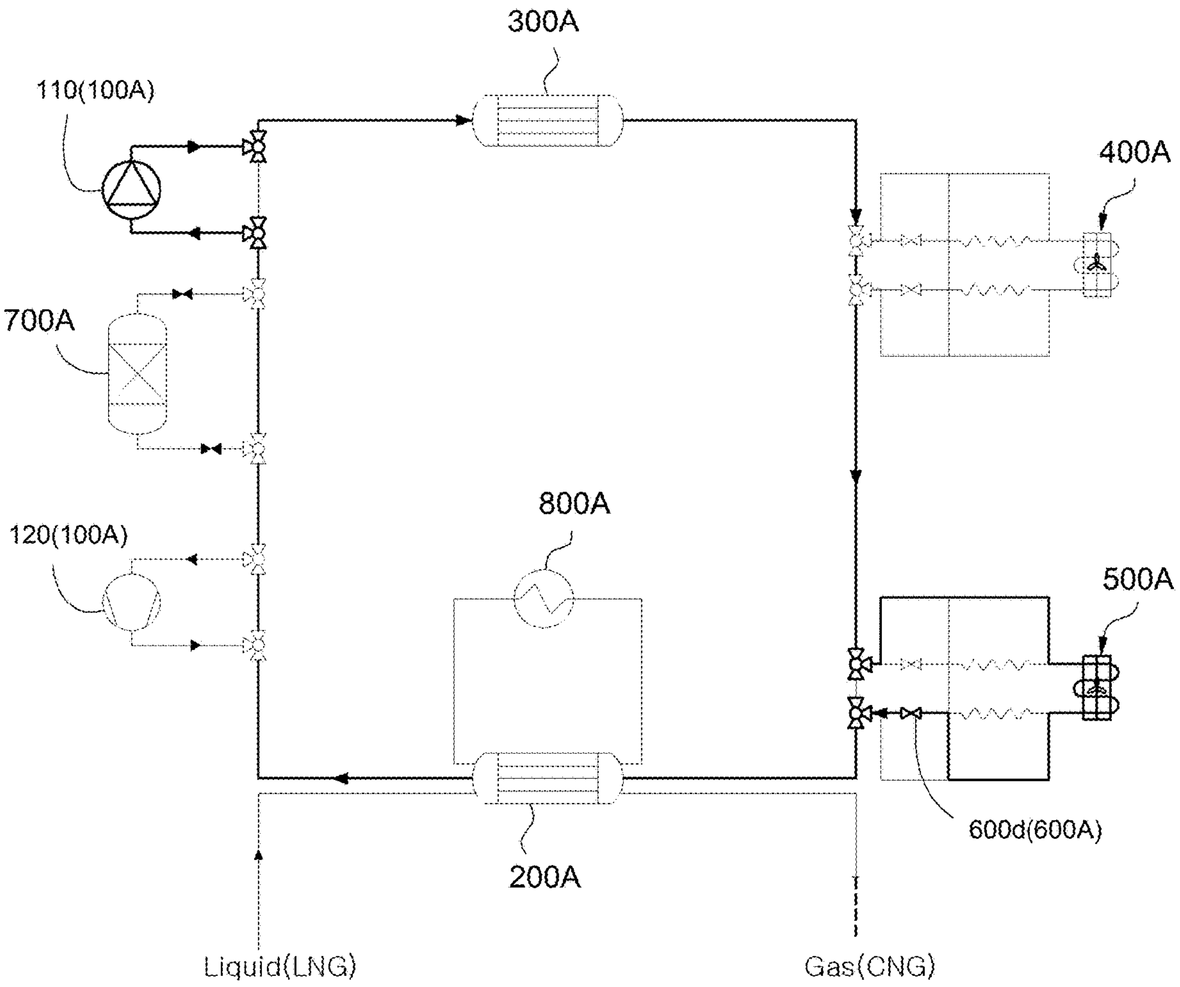
FIG. 16 is a diagram illustrating another operation process of the heat load control system according to the embodiment of the present invention when the amount of cold-heat of the first medium is greater than the amount of heat of the second medium by the first predetermined value.
Figure 17:
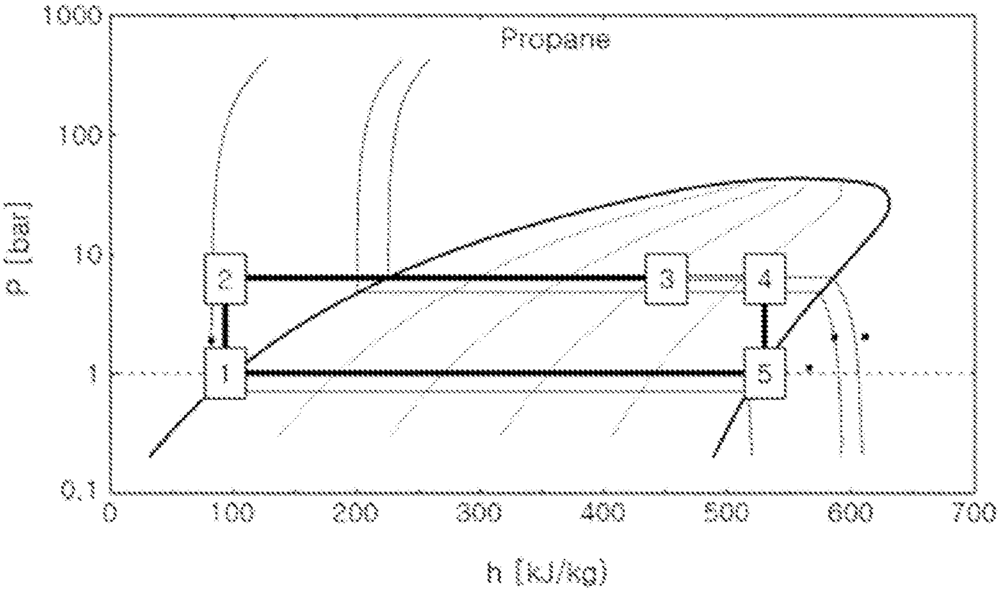
FIG. 17 is a P-h line diagram in the operation process of the heat load control system illustrated in FIG. 16.

FIG. 16 is a diagram illustrating another operation process of the heat load control system according to the embodiment of the present invention when the amount of cold-heat of the first medium is greater than the amount of heat of the second medium by a first predetermined value, and FIG. 17 is a P-h line diagram of the operating process of the heat load control system.

The working fluid receives cold-heat from the first medium while passing through the first heat exchanger 200A, thereby decreasing in temperature (the temperature of the first medium increases). At this time, enthalpy decreases in the P-h line diagram and moves in a direction of a saturated liquid line (1 in FIG. 17). Thereafter, the working fluid increases in pressure while passing through the pressurized means 100A (the pump 110). At this time, the pressure increases in the P-h line diagram (2 in FIG. 17).

Thereafter, the working fluid receives heat from a second medium while passing through the second heat exchanger 300A, thereby increasing in temperature (the temperature of the second medium decreases). At this time, enthalpy increases in the P-h line diagram and passes through a saturated liquid line (3 in FIG. 17). Thereafter, the working fluid receives heat while passing through the heat supply means 500A, thereby increasing in temperature. At this time, the enthalpy increases in the P-h line diagram and moves in a direction of a saturated steam line (4 in FIG. 17). Thereafter, the working fluid decreases in pressure while passing through the expansion valve 610$d$ of the adjustment means 600A. At this time, the pressure decreases in the P-h line diagram (5 in FIG. 17). Thereafter, the working fluid repeats the above-described process.

In the above-described process, when the amount of cold-heat of the first medium is greater than the amount of heat of a second medium by a first predetermined value, the heat supply means 500A supplies heat to a working fluid to balance the amount of cold-heat of the first medium and the amount of heat of the second medium (for example, when an ice thermal storage capacity of the ice thermal storage system 700A reaches saturation, the heat supply means 500A may supply heat to the working fluid). That is, when the amount of cold-heat of the first medium is greater than the amount of heat of the second medium by a relatively small amount (the first predetermined value), the heat supply means 500A supplies heat to the cold-heat of the first medium to balance the cold-heat of the first medium and the heat of the second medium.

Figure 18:
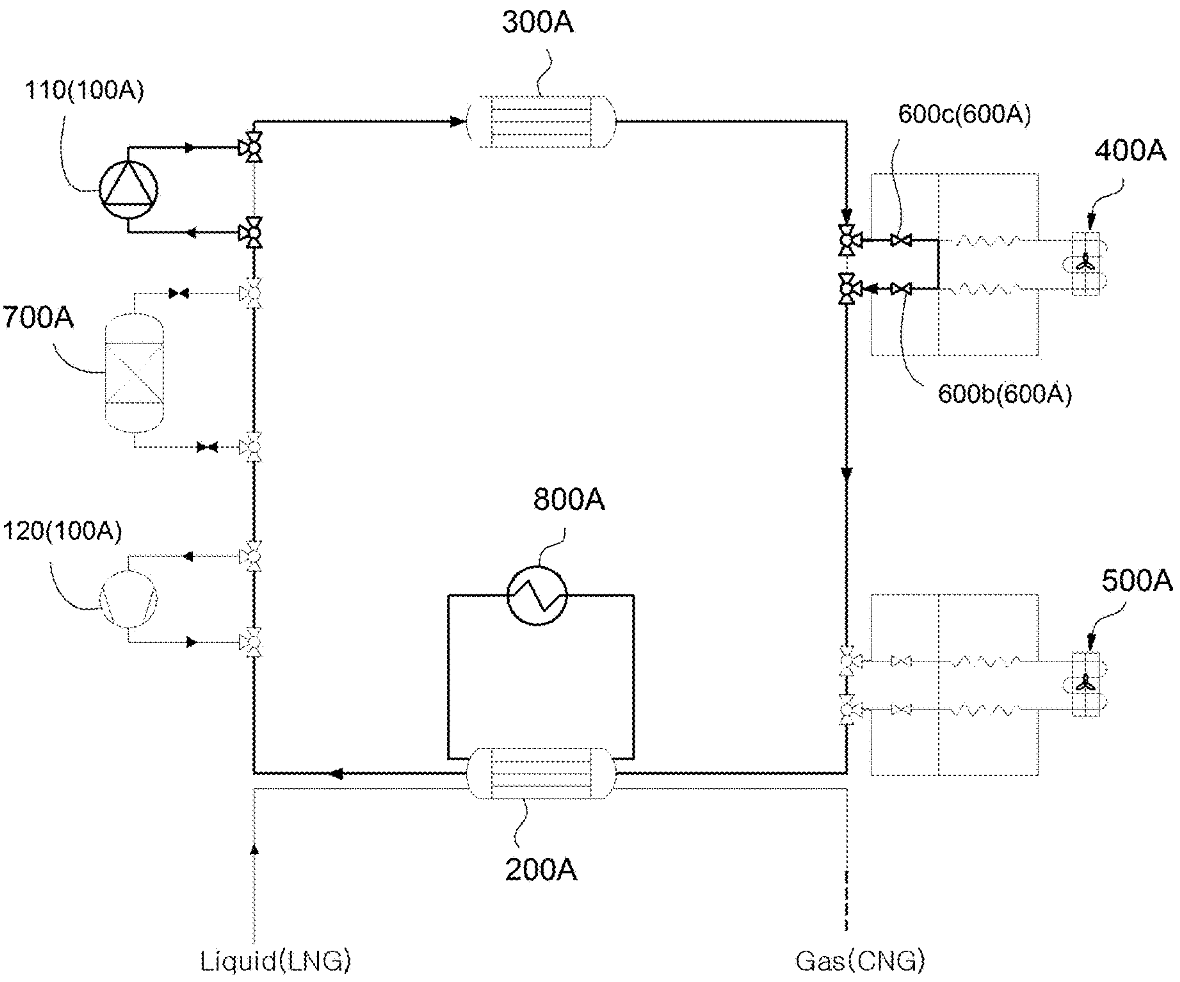
FIG. 18 is a diagram illustrating the operation process of the heat load control system according to the embodiment of the present invention when the amount of cold-heat of the first medium is greater than the amount of heat of the second medium by a second predetermined value.
Figure 19:
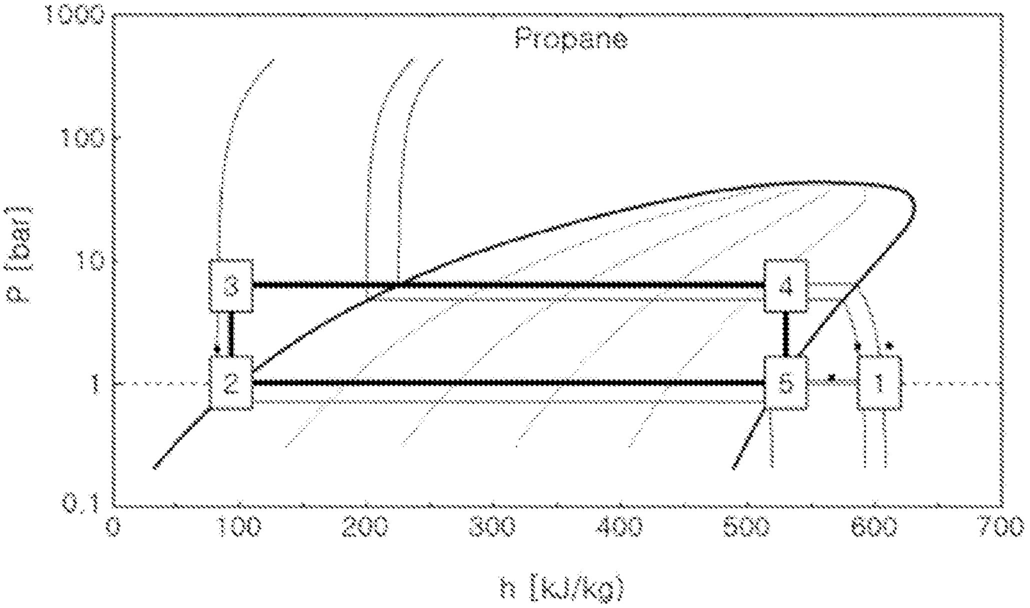
FIG. 19 is a P-h line diagram in the operation process of the heat load control system illustrated in FIG. 18.

FIG. 18 is a view illustrating an operation process of the heat load control system according to the embodiment of the present invention when the amount of cold-heat of a first medium is greater than the amount of heat of a second medium by a second predetermined value, and FIG. 19 is a P-h line diagram in the operation process of the heat load control system illustrated in FIG. 18.

The working fluid receives heat while passing through the heater 800A, thereby increasing in temperature. At this time, enthalpy increases in the P-h line diagram (1 in FIG. 19). At the same time, the working fluid receives cold-heat from the first medium while passing through the first heat exchanger 200A, thereby decreasing in temperature (the temperature of the first medium increases). At this time, the enthalpy decreases in the P-h line diagram and moves in a direction of a saturated liquid line (2 in FIG. 19). Thereafter, the working fluid increases in pressure while passing through the pressurized means 100A (the pump 110). At this time, the pressure increases in the P-h line diagram (3 in FIG. 19). Thereafter, the working fluid receives heat from the second medium while passing through the second heat exchanger 300A, thereby increasing in temperature (the temperature of the second medium decreases). At this time, the enthalpy increases in the P-h line diagram and passes through the saturated liquid line (4 in FIG. 19).

Thereafter, the working fluid decreases in pressure while passing through the expansion valves 610$a$ and 610$b$ of the adjustment means 600A. At this time, the pressure decreases in the P-h line diagram (5 in FIG. 19). Thereafter, the working fluid repeats the above-described process.

In the above-described process, when the amount of cold-heat of a first medium is greater than the amount of heat of a second medium by a second predetermined value (the second predetermined value is greater than the first predetermined value), the heater 800A supplies heat to a working fluid to balance the amount of cold-heat of the first medium and the amount of heat of the second medium. That is, when the amount of cold-heat of the first medium is greater than the amount of heat of the second medium by a relatively large amount (the second predetermined value), the heater 800A supplies heat to balance the amount of cold-heat of the first medium and the amount of heat of the second medium.

Figure 20:
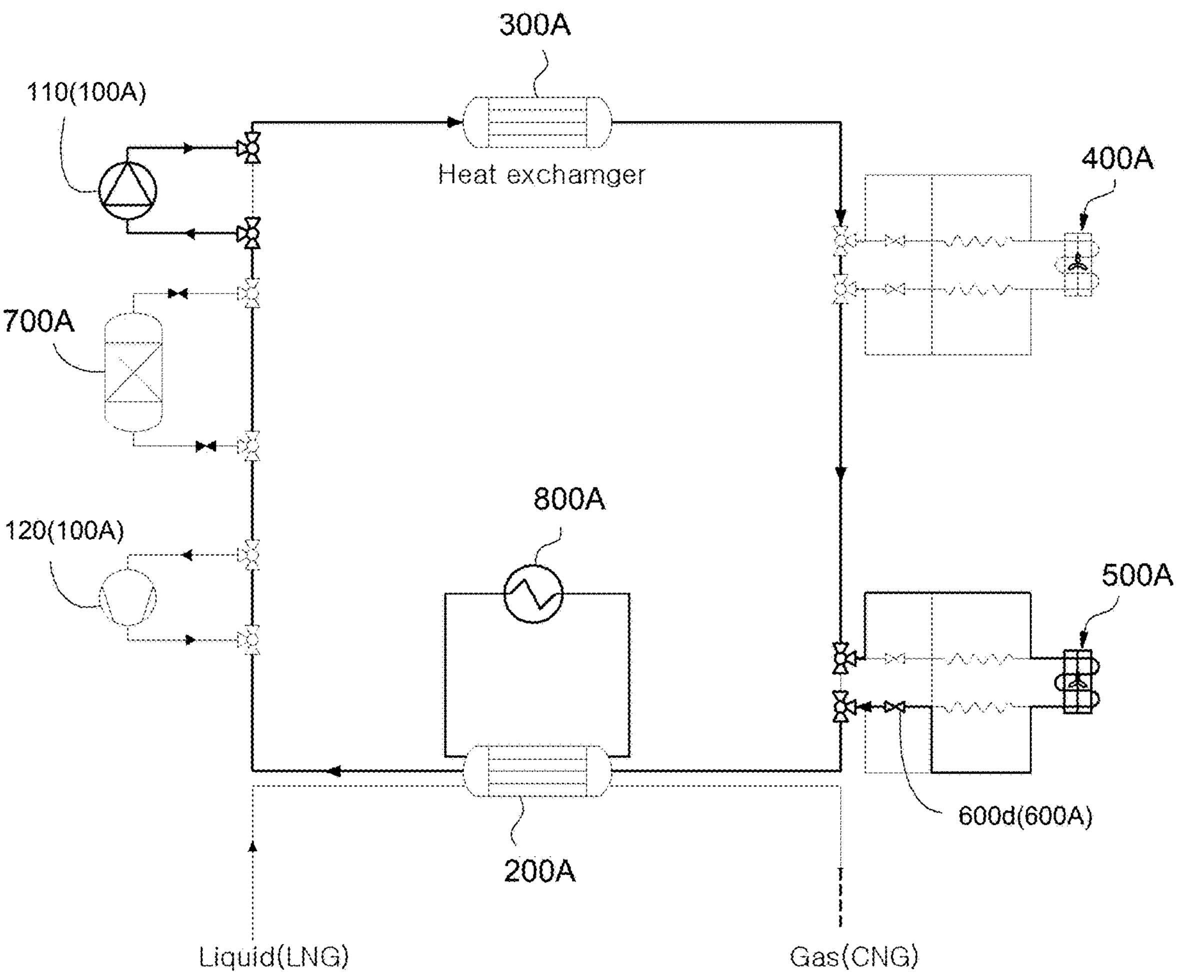
FIG. 20 is a diagram illustrating the operation process of the heat load control system according to the embodiment of the present invention when the cold-heat of the first medium is greater than the heat of the second medium by a third predetermined value.
Figure 21:
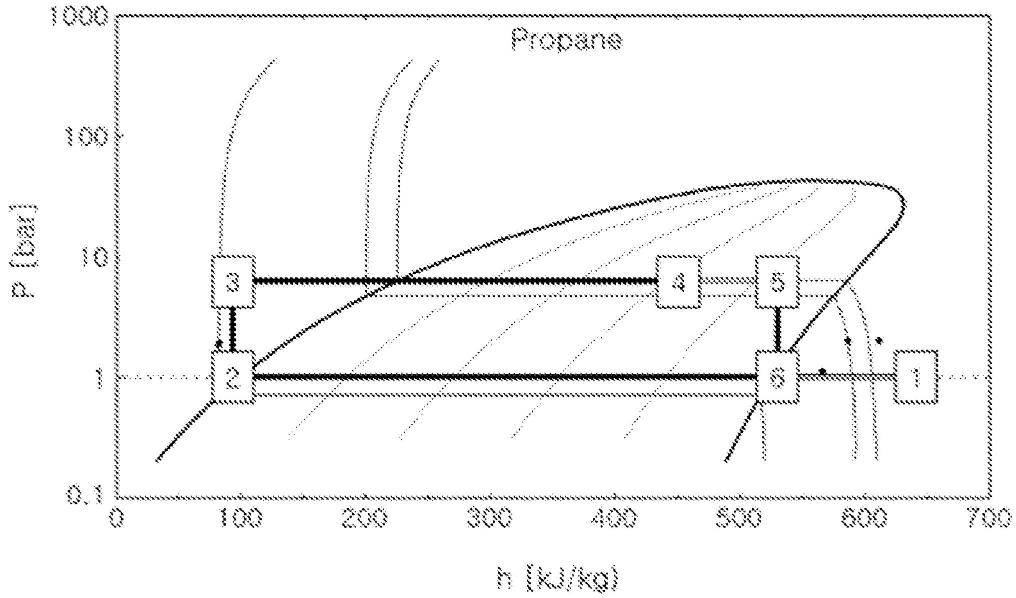
FIG. 21 is a P-h line diagram in the operation process of the heat load control system illustrated in FIG. 20.

FIG. 20 is a diagram illustrating an operation process of the heat load control system according to the embodiment of the present invention when cold-heat of a first medium is greater than heat of a second medium by a third predetermined value, and FIG. 21 is a P-h line diagram of the operation process of the heat load control system illustrated in FIG. 20.

A working fluid receives heat while passing through the heater 800A, thereby increasing in temperature. At this time, enthalpy increases in the P-h line diagram (1 in FIG. 21). At the same time, the working fluid receives cold-heat from the first medium while passing through the first heat exchanger 200A, thereby decreasing in temperature (the temperature of the first medium increases). At this time, the enthalpy decreases in the P-h line diagram and moves in a direction of a saturated liquid line (2 in FIG. 21). Thereafter, the working fluid increases in pressure while passing through the pressurized means 100A (the pump 110). At this time, the pressure increases in the P-h line diagram (3 in FIG. 21). Thereafter, the working fluid receives heat from the second medium while passing through the second heat exchanger 300A, thereby increasing in temperature (the temperature of the second medium decreases). At this time, the enthalpy increases in the P-h line diagram and passes through the saturated liquid line (4 in FIG. 21). Thereafter, the working fluid receives heat while passing through the heat supply means 500A, thereby increasing in temperature. At this time, the enthalpy increases in the P-h line diagram and moves in a direction of a saturated steam line (5 in FIG. 21). Thereafter, the working fluid decreases in pressure while passing through the expansion valve 610*d* of the adjustment means 600A. At this time, the pressure decreases in the P-h line diagram (6 in FIG. 21). Thereafter, the working fluid repeats the above-described process.

In the above-described process, when the amount of cold-heat of a first medium is greater than the amount of heat of a second medium by a third predetermined value (the third predetermined value is greater than the second predetermined value), not only the heater 800A supplies heat to a working fluid but also the heat supply means 500A supplies heat to the working fluid to balance the amount of cold-heat of the first medium and the amount of heat of the second medium. That is, when the amount of cold-heat of the first medium is greater than the amount of heat of the second medium by a relatively large amount (the third predetermined value), the heater 800A and the heat supply means 500A supply heat, and thus, the amount of cold-heat of the first medium and the amount of heat of the second medium may be balanced.

Figure 22:
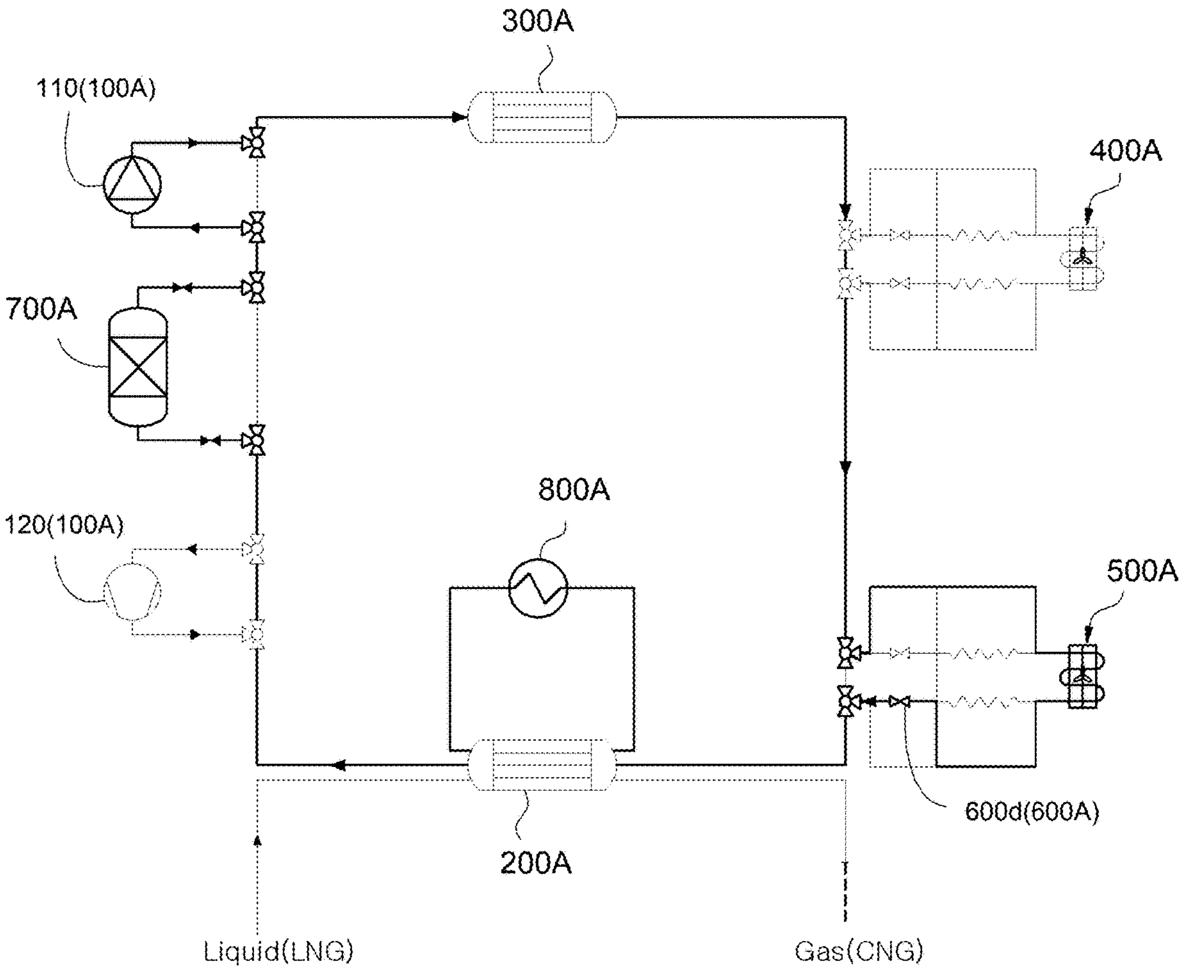
FIG. 22 is a view illustrating the operation process of the heat load control system according to an embodiment of the present invention when the amount of cold-heat of the first medium is greater than the amount of heat of the second medium by a fourth predetermined value.
Figure 23:
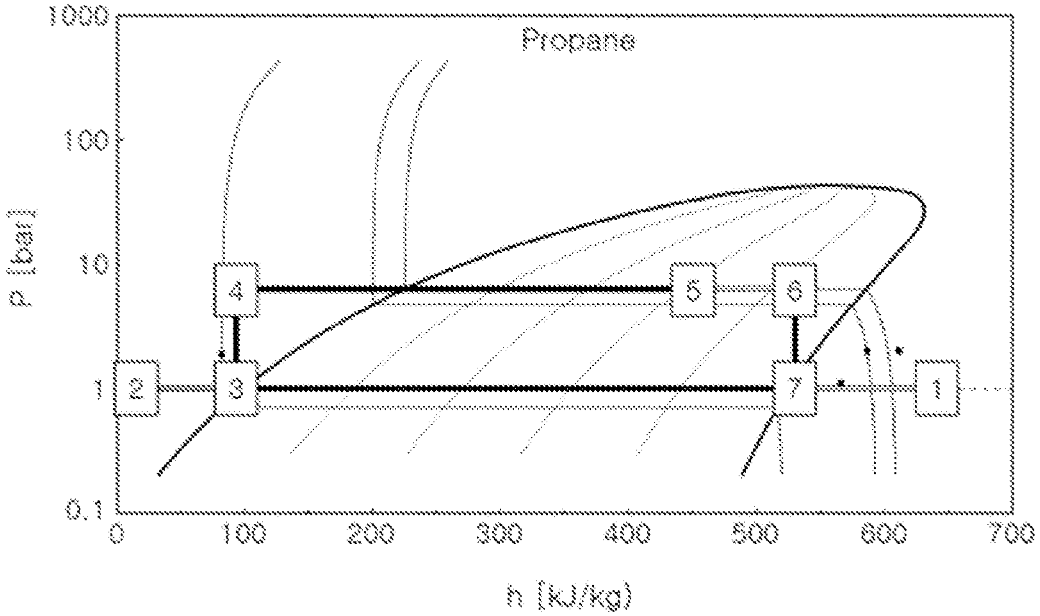
FIG. 23 is a P-h line diagram in the operation process of the heat load control system illustrated in FIG. 22.

FIG. 22 is a diagram illustrating an operation process of the heat load control system according to the embodiment of the present invention when the amount of cold-heat of a first medium is greater than the amount of heat of a second medium by a fourth predetermined value, and FIG. 23 is a P-h line diagram of the operation process of the heat load control system illustrated in FIG. 22.

A working fluid receives heat while passing through the heater 800A, thereby increasing in temperature. At this time, enthalpy increases in the P-h line diagram (1 in FIG. 23). At the same time, the working fluid receives cold-heat from the first medium while passing through the first heat exchanger 200A, thereby decreasing in temperature (the temperature of the first medium increases). At this time, the enthalpy decreases in the P-h line diagram and passes through a saturated liquid line (2 in FIG. 23). Thereafter, the working fluid absorbs heat while passing through the ice thermal storage system 700A, thereby increasing in temperature. At this time, the enthalpy increases in the P-h line diagram and moves in a direction of the saturated liquid line (3 in FIG. 23). Thereafter, the working fluid increases in pressure while passing through the pressurized means 100A (the pump 110). At this time, the pressure increases in the P-h line diagram (4 in FIG. 23). Thereafter, the working fluid receives heat from the second medium while passing through the second heat exchanger 300A, thereby increasing in temperature (the temperature of the second medium decreases). At this time, the enthalpy increases in the P-h line diagram and passes through the saturated liquid line (5 in FIG. 23). Thereafter, the working fluid receives heat while passing through the heat supply means 500A, thereby increasing in temperature. At this time, the enthalpy increases in the P-h line diagram and moves in a direction of a saturated steam line (6 in FIG. 23).

Thereafter, the working fluid decreases in pressure while passing through the expansion valve 610*d* of the adjustment means 600A. At this time, the pressure decreases in the P-h line diagram (7 in FIG. 23). Thereafter, the working fluid repeats the above-described process.

In the above-described process, when the amount of cold-heat of a first medium is greater than the amount of heat of a second medium by a fourth predetermined value (the fourth predetermined value is greater than the third predetermined value), the heater 800A supplies heat to a working fluid, the heat supply means 500A also supplies heat to the working fluid, the ice thermal storage system 700A absorbs cold-heat, and thus, the amount of cold-heat of the first medium and the amount of heat of the second medium are balanced. That is, when the amount of cold-heat of the first medium is greater than the amount of heat of the second medium by a relatively very large amount (the fourth predetermined value), the heater 800A and the heat supply means 500A supply heat, and the ice thermal storage system 700A absorbs cold-heat, and thus, the amount of cold-heat of the first medium and the amount of heat of the second medium may be balanced.

Figure 24:
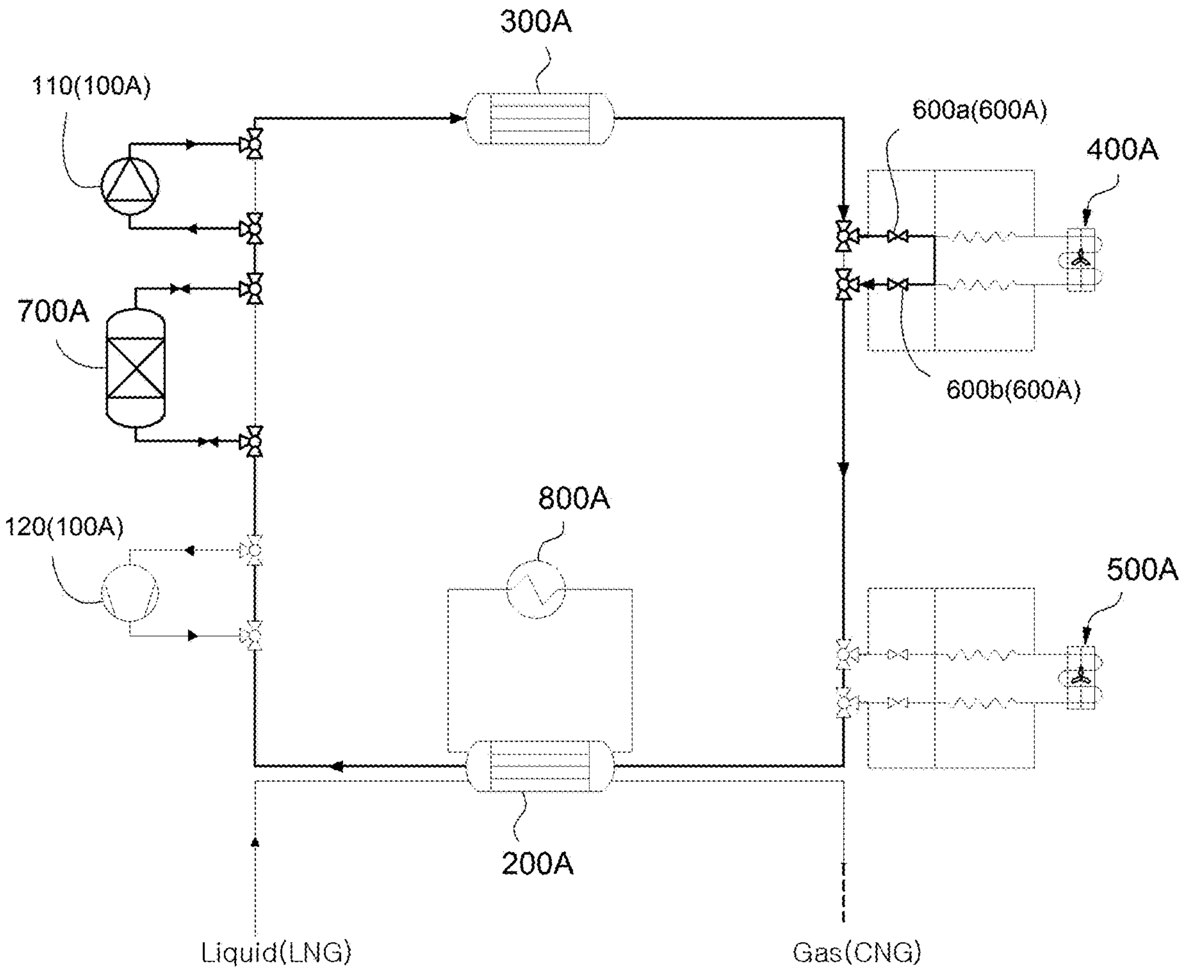
FIG. 24 is a diagram illustrating the operation process of the heat load control system according to the embodiment of the present invention when the amount of heat of the second medium is greater than the amount of cold-heat of the first medium by a fifth predetermined value.
Figure 25:
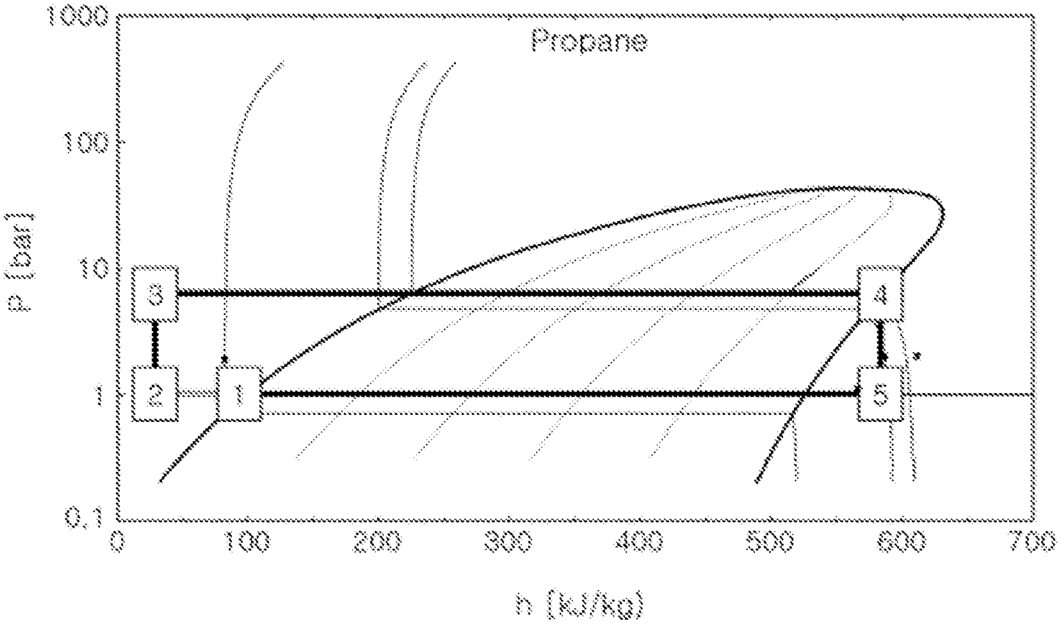
FIG. 25 is a P-h line diagram in the operation process of the heat load control system illustrated in FIG. 24.

FIG. 24 is a diagram illustrating an operation process of the heat load control system according to the embodiment of the present invention when the amount of heat of a second medium is greater than the amount of cold-heat of a first medium by a fifth predetermined value, and FIG. 25 is a P-h line diagram of the operation process of the heat load control system illustrated in FIG. 24.

A working fluid receives cold-heat from the first medium while passing through the first heat exchanger 200A, thereby decreasing in temperature (the temperature of the first medium increases). At this time, enthalpy decreases in the P-h line diagram and moves in a direction of a saturated liquid line (1 in FIG. 25). Thereafter, the working fluid receives cold-heat while passing through the ice thermal storage system 700A, thereby decreasing in temperature. At this time, the enthalpy decreases in the P-h line diagram and moves in the direction of the saturated liquid line (2 in FIG. 25). Thereafter, the working fluid increases in pressure while passing through the pressurized means 100A (the pump 110). At this time, the pressure increases in the P-h line diagram (3 in FIG. 25). Thereafter, the working fluid receives heat from the second medium while passing through the second heat exchanger 300A, thereby increasing in temperature (the temperature of the second medium decreases). At this time, the enthalpy increases in the P-h line diagram and passes through the saturated liquid line (4 in FIG. 25). Thereafter, the working fluid decreases in pressure while passing through the expansion valves 610*a* and 610*b* of the adjustment means 600A. At this time, the pressure decreases in the P-h line diagram (5 in FIG. 25). Thereafter, the working fluid repeats the above-described process.

In the above-described process, when the amount of heat of a second medium is greater than the amount of cold-heat of a first medium by a fifth predetermined value, the ice thermal storage system 700A supplies cold-heat to a working fluid to balance the amount of cold-heat of the first medium and the amount of heat of the second medium. That is, when the amount of heat of the second medium is greater than the amount of cold-heat of the first medium by a relatively small amount (the fifth predetermined value), the ice thermal storage system 700A supplies cold-heat, and thus, the amount of cold-heat of the first medium and the amount of heat of the second medium may be balanced.

Figure 26:
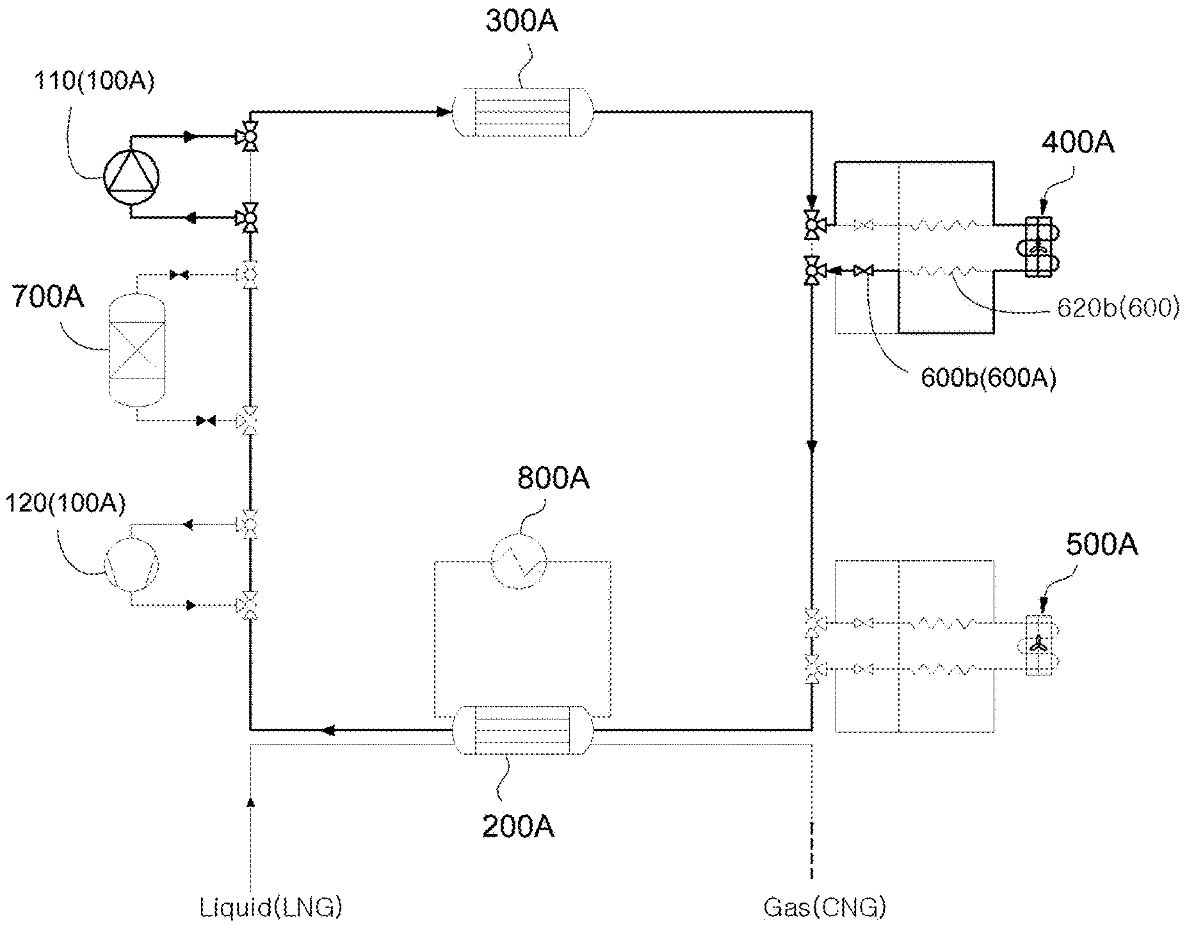
FIG. 26 is a diagram illustrating another operation process of the heat load control system according to the embodiment of the present invention when the amount of heat of the second medium is greater than the amount of cold-heat of the first medium by the fifth predetermined value.
Figure 27:
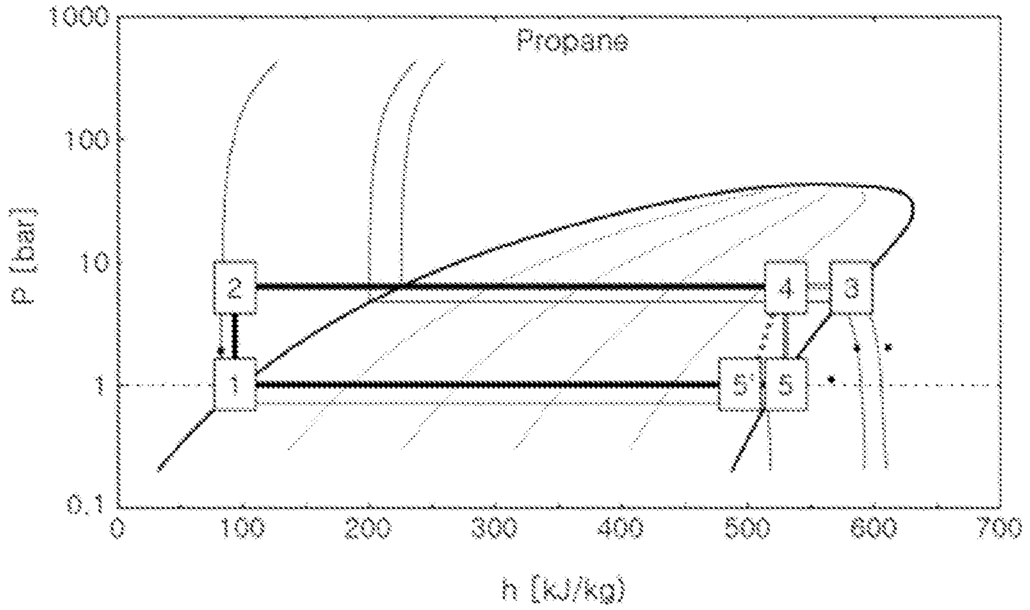
FIG. 27 is a P-h line diagram in the operation process of the heat load control system illustrated in FIG. 26.

FIG. 26 is a diagram illustrating another operation process of the heat load control system according to the embodiment of the present invention when the amount of heat of a second medium is greater than the amount of cold-heat of a first medium by a fifth predetermined value, and FIG. 27 is a P-h line diagram of the operating process of the heat load control system illustrated in FIG. 26.

A working fluid receives cold-heat from a first medium while passing through the first heat exchanger 200A, thereby decreasing in temperature (the temperature of the first medium increases). At this time, enthalpy decreases in the P-h line diagram and moves in a direction of a saturated liquid line (1 in FIG. 27). Thereafter, the working fluid increases in pressure while passing through the pressurized means (100, pump 110). At this time, the pressure increases in the P-h line diagram (2 in FIG. 27). Thereafter, the working fluid receives heat from a second medium while passing through the second heat exchanger 300A, thereby increasing in temperature (the temperature of the second medium decreases). At this time, the enthalpy increases in the P-h line diagram and passes through the saturated liquid line (3 in FIG. 27). Thereafter, the working fluid dissipates heat while passing through the heat dissipation means 400A, thereby decreasing in temperature. At this time, the enthalpy decreases in the P-h line diagram (4 in FIG. 27). Thereafter, the working fluid decreases in pressure while passing through the expansion valve 610*b* of the adjustment means 600A. At this time, the pressure decreases in the P-h line diagram (5 in FIG. 27). Alternatively, the working fluid decrease in temperature and pressure while passing through the capillary tube 620*b* without passing through the expansion valve 610*b* of the adjustment means 600A. At this time, both the pressure and the enthalpy decrease in the P-h line diagram (5' in FIG. 27). Thereafter, the working fluid repeats the above-described process.

In the above-described process, when the amount of heat of a second medium is greater than the amount of cold-heat of a first medium by a fifth predetermined value, the heat dissipation means 400A dissipates heat (in this case, heat may also be dissipated through the capillary tube 620*b*) to balance the amount of cold-heat of the first medium and the amount of heat of the second medium. That is, when the amount of heat of the second medium is greater than the amount of cold-heat of the first medium by a relatively small amount (the fifth predetermined value), the heat dissipation means 400A dissipates heat, thereby balancing the amount of cold-heat of the first medium and the amount of heat of the second medium.

Figure 28:
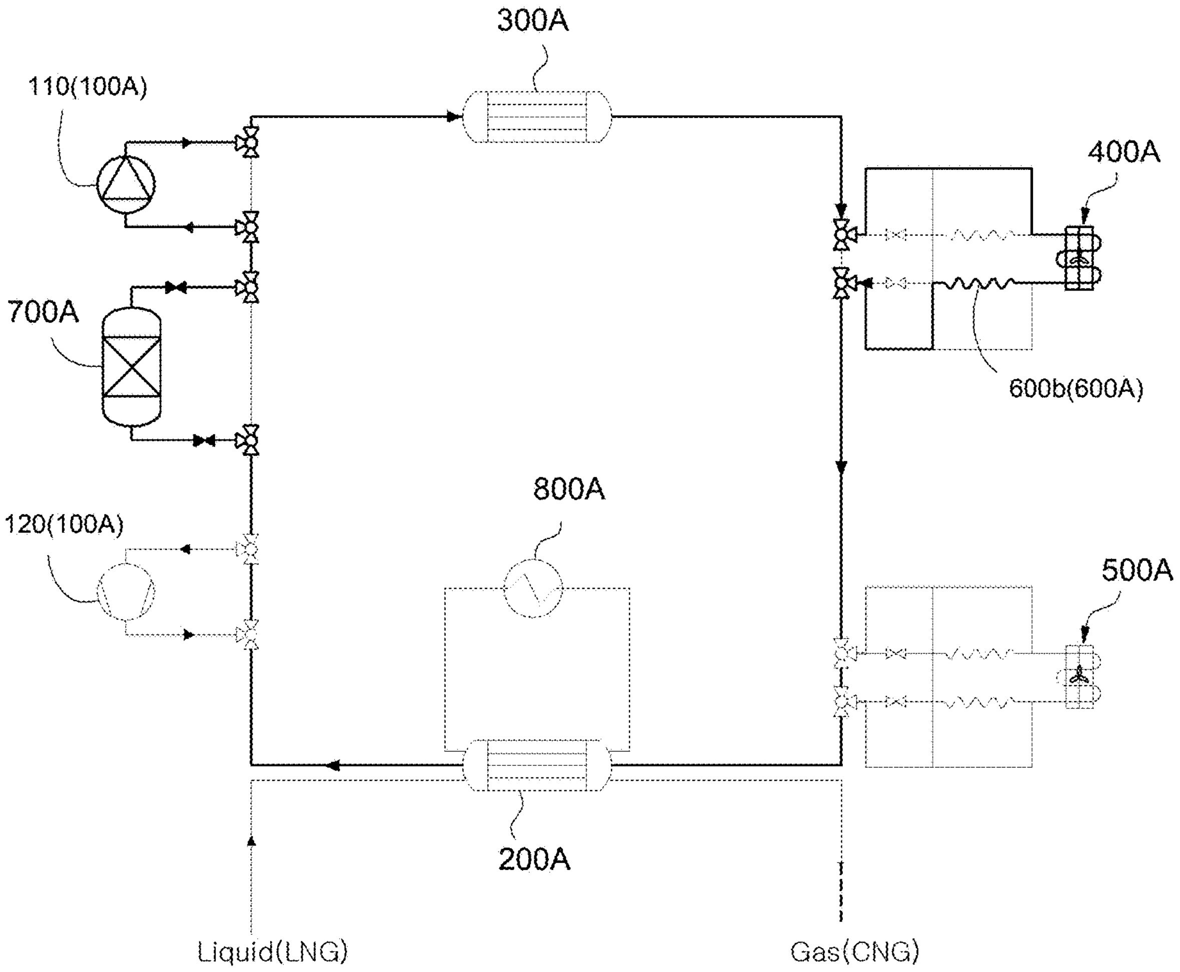
FIG. 28 is a diagram illustrating the operation process of the heat load control system according to the embodiment of the present invention when the amount of heat of the second medium is greater than the amount of cold-heat of the first medium by a sixth predetermined value.
Figure 29:
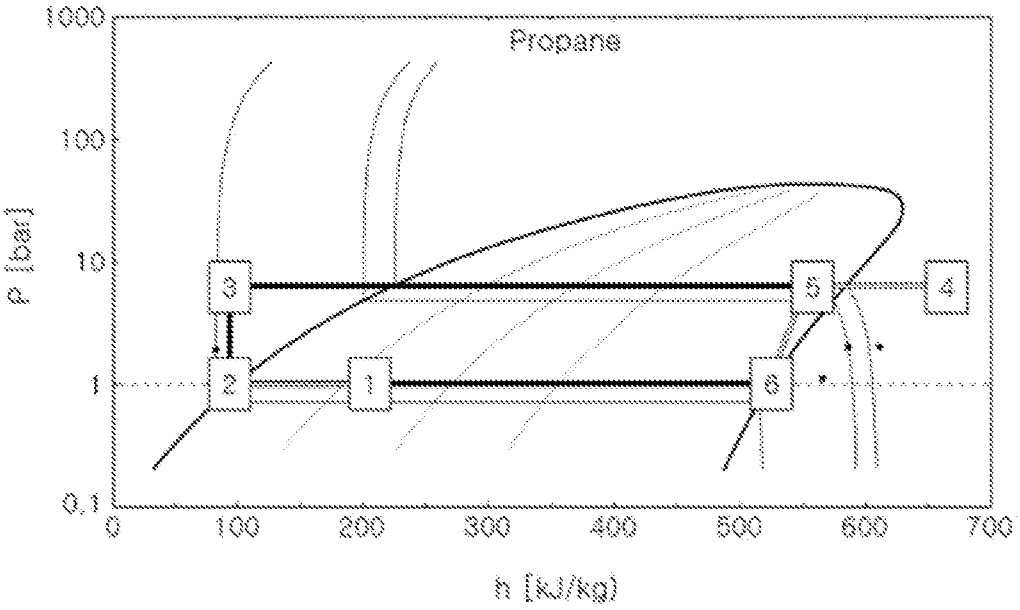
FIG. 29 is a P-h line diagram in the operation process of the heat load control system illustrated in FIG. 28.

FIG. 28 is a diagram illustrating an operation process of the heat load control system according to the embodiment of the present invention when the amount of heat of a second medium is greater than the amount of cold-heat of a first medium by a sixth predetermined value, and FIG. 29 is a P-h line diagram in the operation process of the heat load control system illustrated in FIG. 28.

A working fluid receives cold-heat from a first medium while passing through the first heat exchanger 200A, thereby decreasing in temperature (the temperature of the first medium increases). At this time, enthalpy decreases in the P-h line diagram and moves in a direction of a saturated liquid line (1 in FIG. 29). Thereafter, the working fluid receives cold-heat while passing through the ice thermal storage system 700A, thereby decreasing in temperature. At this time, the enthalpy decreases in the P-h line diagram and moves in the direction of the saturated liquid line (2 in FIG. 29). Thereafter, the working fluid increases in pressure while passing through the pressurized means (100, pump 110). At this time, the pressure increases in the P-h line diagram (3 in FIG. 29). Thereafter, the working fluid receives heat from the second medium while passing through the second heat exchanger 300A, thereby increasing in temperature (the temperature of the second medium decreases). At this time, the enthalpy increases in the P-h line diagram and passes through a saturated steam line (4 in FIG. 29). Thereafter, the working fluid dissipates heat while passing through the heat dissipation means 400A, thereby decreasing in temperature. At this time, the enthalpy decreases in the P-h line diagram and passes through the saturated steam line (5 in FIG. 29). Thereafter, the working fluid may decrease in temperature and pressure while passing through the capillary tube 620*b* of the adjustment means 600A. At this time, both the pressure and the enthalpy decrease in the P-h line diagram (6 in FIG. 29). Thereafter, the working fluid repeats the above-described process.

In the above-described process, when the amount of heat of a second medium is greater than the amount of cold-heat of a first medium by a sixth predetermined value (the sixth predetermined value is greater than the fifth predetermined value), the ice thermal storage system 700A supplies cold-heat, the heat dissipation means (400) dissipates heat through the capillary tube 620*b*, and thus, the amount of cold heat of the first medium and the amount of heat of the second medium are balanced. That is, when the amount of heat of the second medium is greater than the amount of cold-heat of the first medium by a relatively large amount (the sixth predetermined value), the ice thermal storage system 700A supplies cold-heat, and the heat dissipation means 400A and the capillary tube 620*b* dissipate heat, and thereby, the amount of cold-heat of the first medium and the amount of heat of the second medium may be balanced.

In addition, although it is described that a working fluid increases in pressure while passing through the pump 110 as the pressurized means 100A, the present invention is not limited thereto, and the working fluid may also increase in pressure while passing through the compressor 120 as the pressurized means 100A. For example, when the working fluid is in a liquid state, the working fluid may pass through the pump 110, and as described below, when the working fluid is in a gaseous state, the working fluid may pass through the compressor 120.

Figure 30:
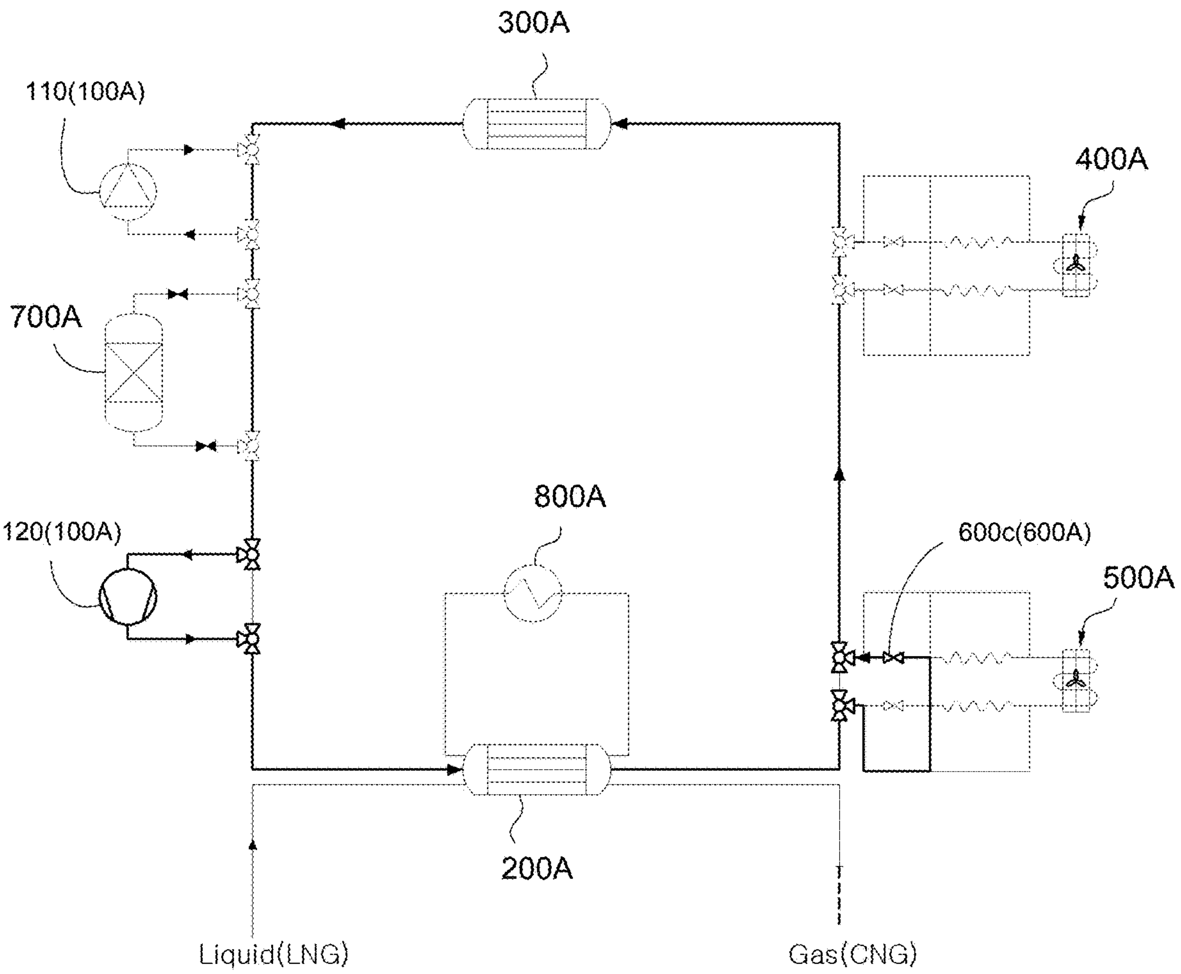
FIG. 30 is a diagram illustrating the operation process of the heat load control system according to the embodiment of the present invention when the amount of cold-heat of the first medium is greater than the amount of heat of the second medium.
Figure 31:
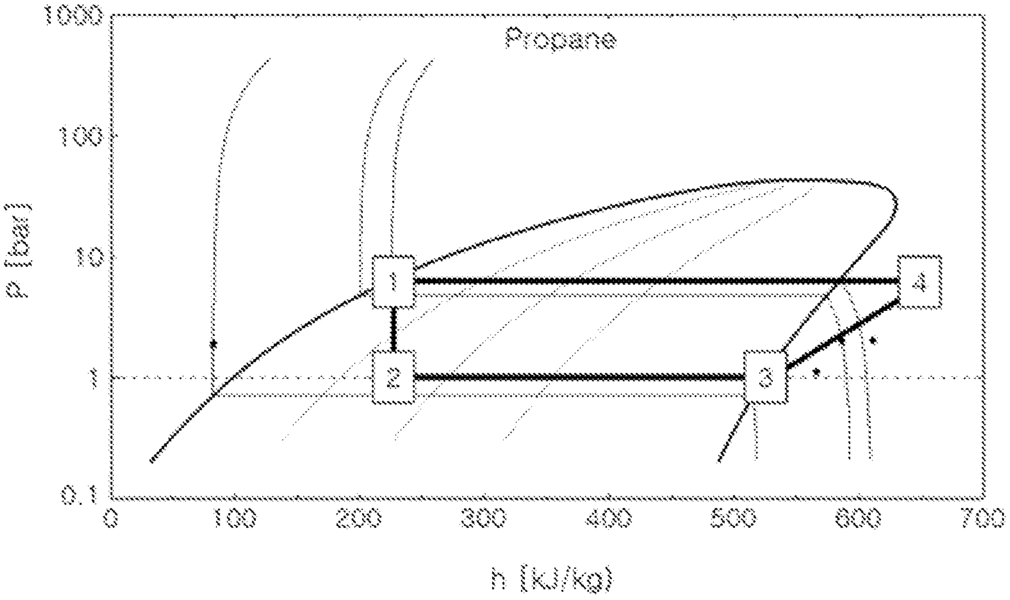
FIG. 31 is a P-h line diagram in the operation process of the heat load control system illustrated in FIG. 30.

FIG. 30 is a diagram illustrating an operation process of the heat load control system according to the embodiment of the present invention when the amount of cold-heat of a first medium is greater than the amount of heat of a second medium, and FIG. 31 is a P-h line diagram in the operation process of the heat load control system illustrated in FIG. 30.

The working fluid receives cold-heat from a first medium while passing through the first heat exchanger 200A, thereby decreasing in temperature (the temperature of the first medium increases). At this time, enthalpy decreases in the P-h line diagram and moves in a direction of a saturated liquid line (1 in FIG. 31). Thereafter, the working fluid decreases in pressure while passing through the expansion valve 610*c* of the adjustment means 600A. At this time, the pressure decreases in the P-h line diagram (2 in FIG. 31). Thereafter, the working fluid receives heat from the second medium while passing through the second heat exchanger 300A, thereby increasing in temperature (the temperature of the second medium decreases). At this time, the enthalpy increases in the P-h line diagram and moves in a direction of a saturated steam line (3 in FIG. 31). Thereafter, the working fluid increases in pressure and temperature while passing through the pressurized means 100A (the compressor 120). At this time, the pressure and enthalpy increase in the P-h line diagram (4 in FIG. 31). Thereafter, the working fluid repeats the above-described process.

In the above-described process, when the amount of cold-heat of a first medium is greater than the amount of heat of a second medium, the compressor 120 supplies heat to a working fluid to balance the amount of cold-heat of the first medium and the amount of heat of the second medium. In this way, since the temperature and enthalpy may be increased through the compressor 120, when heat of the working fluid is exchanged in the first heat exchanger 200A, the working fluid may be at a higher temperature condition, compared to the previous cases, and when heat of the working fluid is exchanged in the heat exchanger 300, the working fluid may be at a lower temperature condition compared to the previous cases.

Figure 32:
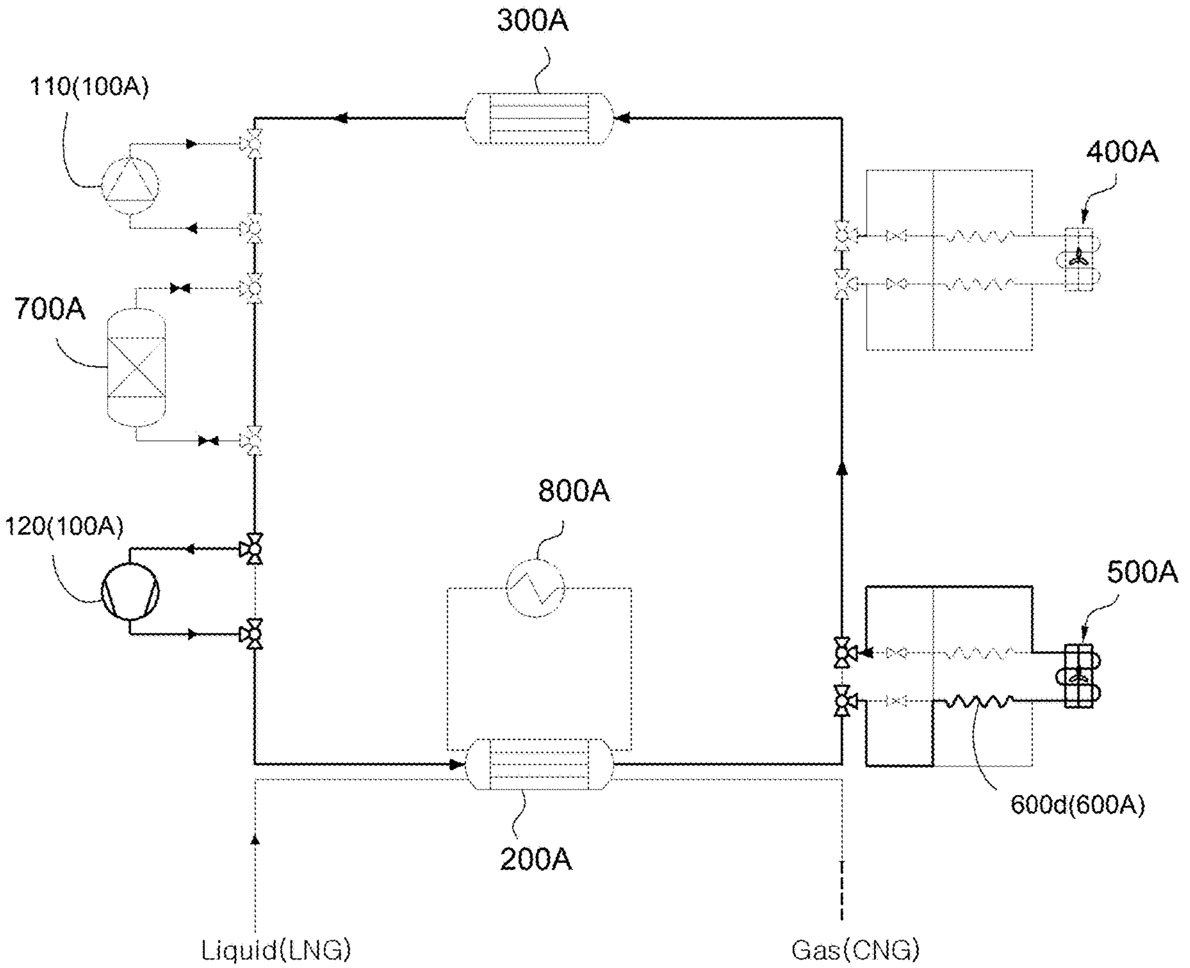
FIG. 32 is a diagram illustrating the operation process of the heat load control system according to the embodiment of the present invention when the amount of cold-heat of the first medium is greater than the amount of heat of the second medium.
Figure 33:
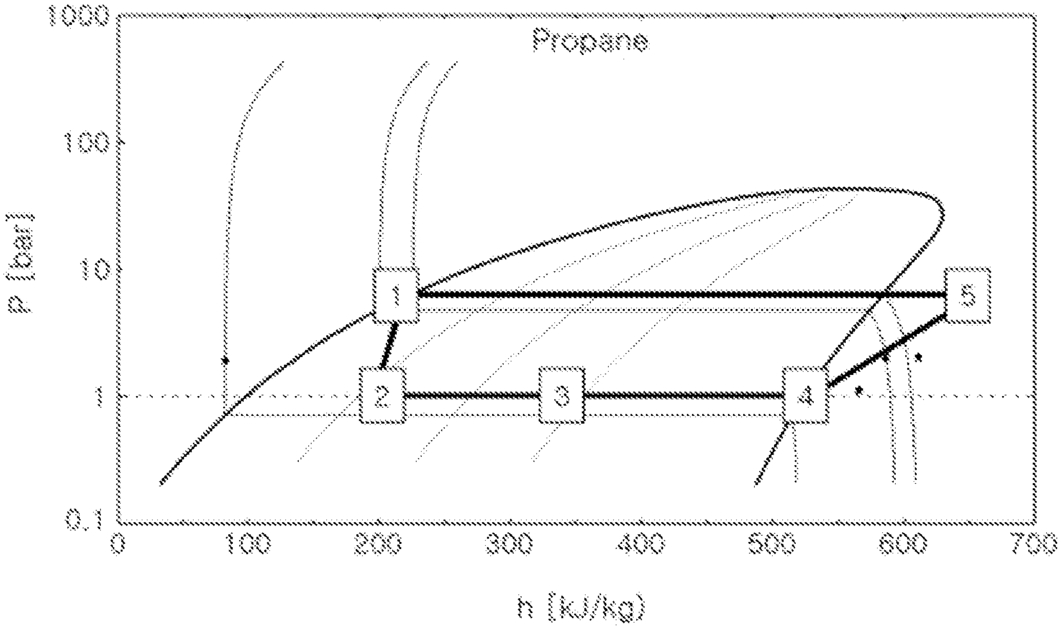
FIG. 33 is a P-h line diagram in the operation process of the heat load control system illustrated in FIG. 32.

FIG. 32 is a diagram illustrating an operation process of the heat load control system according to the embodiment of the present invention when the amount of cold-heat of a first medium is greater than the amount of heat of a second medium, and FIG. 33 is a P-h line diagram in the operation process of the heat load control system illustrated in FIG. 32.

A working fluid receives cold-heat from a first medium while passing through the first heat exchanger 200A, thereby decreasing in temperature (the temperature of the first medium increases). At this time, enthalpy decreases in the P-h line diagram and moves in a direction of a saturated liquid line (1 in FIG. 33). Thereafter, the working fluid decreases in temperature and pressure while passing through the capillary tube (620*d*) of the adjustment means (600). At this time, both enthalpy and pressure decrease in the P-h line diagram (2 in FIG. 33). Thereafter, the working fluid receives heat while passing through the heat supply means 500A, thereby increasing in temperature. At this time, the enthalpy increases in the P-h line diagram and moves in a direction of a saturated steam line (3 in FIG. 33). Thereafter, the working fluid receives heat from a second medium while passing through the second heat exchanger 300A, thereby increasing in temperature (the temperature of the second medium decreases). At this time, the enthalpy increases in the P-h line diagram and moves in a direction of the saturated steam line (4 in FIG. 33). Thereafter, the working fluid increases in pressure and temperature while passing through the pressurized means 100A (the compressor 120). At this time, the pressure and enthalpy increase in the P-h line diagram (5 in FIG. 33). Thereafter, the working fluid repeats the above-described process.

In the above-described process, when the amount of cold-heat of a first medium is greater than the amount of heat of a second medium, the heat supply means 300 and the compressor 120 supply heat to a working fluid to balance the amount of cold-heat of the first medium and the amount of heat of the second medium. In order for the working fluid to absorb heat while passing through the heat supply means 500A, the working fluid has to be sufficiently cooled while passing through the first heat exchanger 200A, but when the working fluid is not sufficiently cooled, the working fluid passes through the capillary tube (620*d*, or the expansion valve) to be decreased in pressure and temperature, thereby absorbing heat in an isothermal process.

Figure 34:
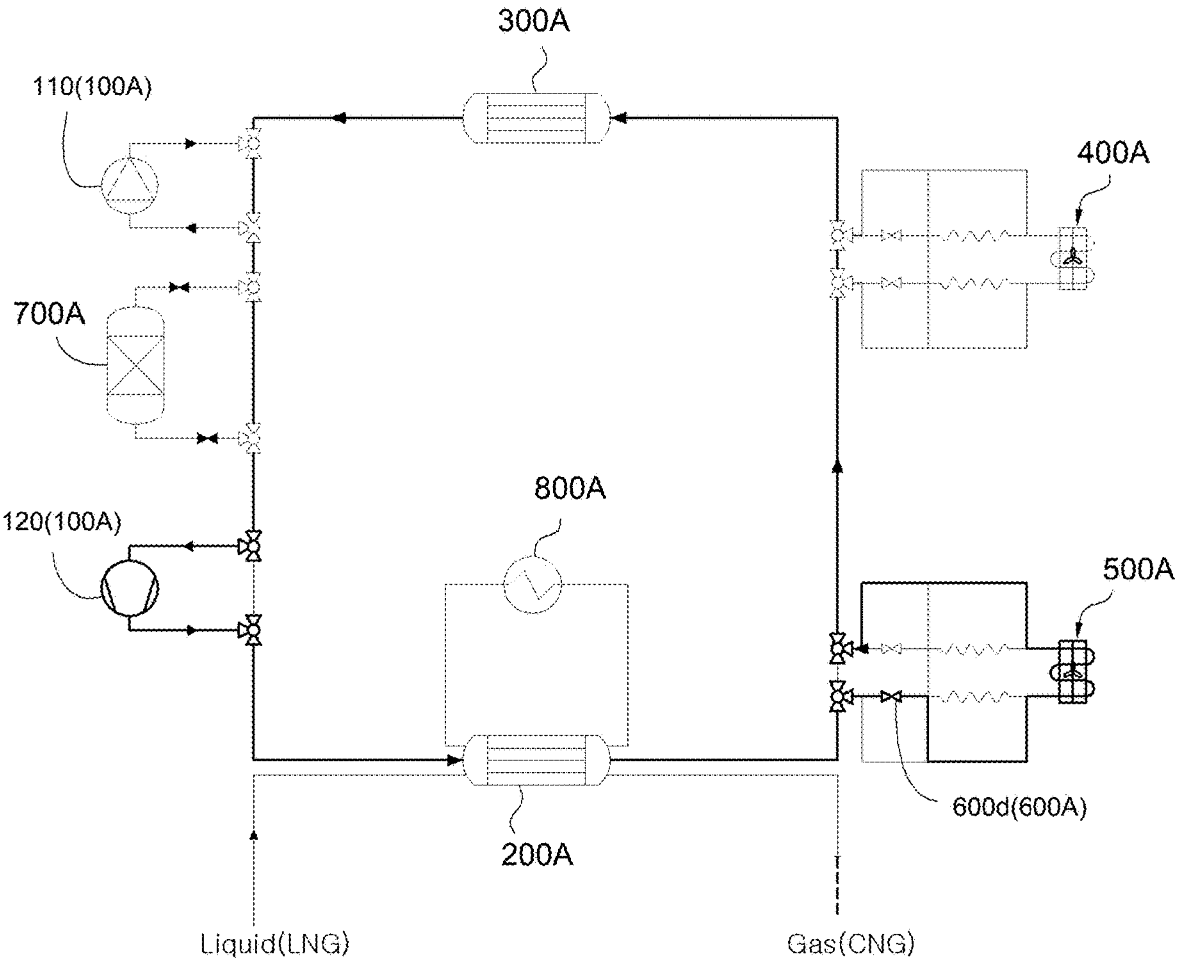
FIG. 34 is a diagram illustrating the operation process of the heat load control system according to the embodiment of the present invention when the amount of cold-heat of the first medium is greater than the amount of heat of the second medium.
Figure 35:
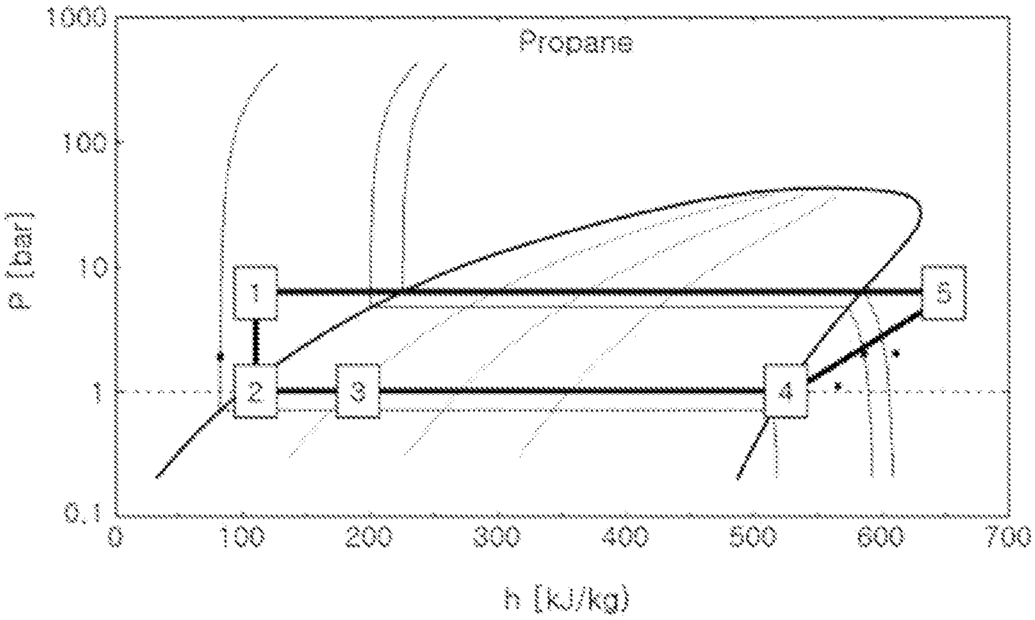
FIG. 35 is a P-h line diagram in the operation process of the heat load control system illustrated in FIG. 34.

FIG. 34 is a diagram illustrating an operation process of the heat load control system according to the embodiment of the present invention when the amount of cold-heat of a first medium is greater than the amount of heat of a second medium, and FIG. 35 is a P-h line diagram in the operation process of the heat load control system illustrated in FIG. 34.

A working fluid receives cold-heat from a first medium while passing through the first heat exchanger 200A, thereby decreasing in temperature (the temperature of the first medium increases). At this time, enthalpy decreases in the P-h line diagram and passes through a saturated liquid line and a phase change is made (1 in FIG. 35). Thereafter, the working fluid decreases in pressure while passing through the expansion valve 610*d* of the adjustment means 600A. At this time, the pressure decreases in the P-h line diagram (2 in FIG. 35). Thereafter, the working fluid receives heat while passing through the heat supply means 500A, thereby increasing in temperature. At this time, the enthalpy increases in the P-h line diagram and moves in a direction of a saturated steam line (3 in FIG. 35). Thereafter, the working fluid receives heat from a second medium while passing through the second heat exchanger 300A, thereby increasing in temperature (the temperature of the second medium decreases). At this time, the enthalpy increases in the P-h line diagram and moves in the direction of the saturated steam line (4 in FIG. 35). Thereafter, the working fluid increases in pressure and temperature while passing through the pressurized means 100A (the compressor 120). At this time, the pressure and enthalpy increase in the P-h line diagram (5 in FIG. 35). Thereafter, the working fluid repeats the above-described process.

In the above-described process, when the amount of cold-heat of a first medium is greater than the amount of heat of a second medium, the heat supply means 500A and the compressor 120 supply heat to a working fluid to balance the amount of cold-heat of the first medium and the amount of heat of the second medium. When the working fluid is cooled while passing through the first heat exchanger 200A and phase-changed to a liquid, the pressure is decreased by the expansion valve 610*d*, an the evaporative temperature of the working fluid is decreased in a two-phase state, efficiency is increased by an isothermal process, and the additional heat may be absorbed.

Figure 36:
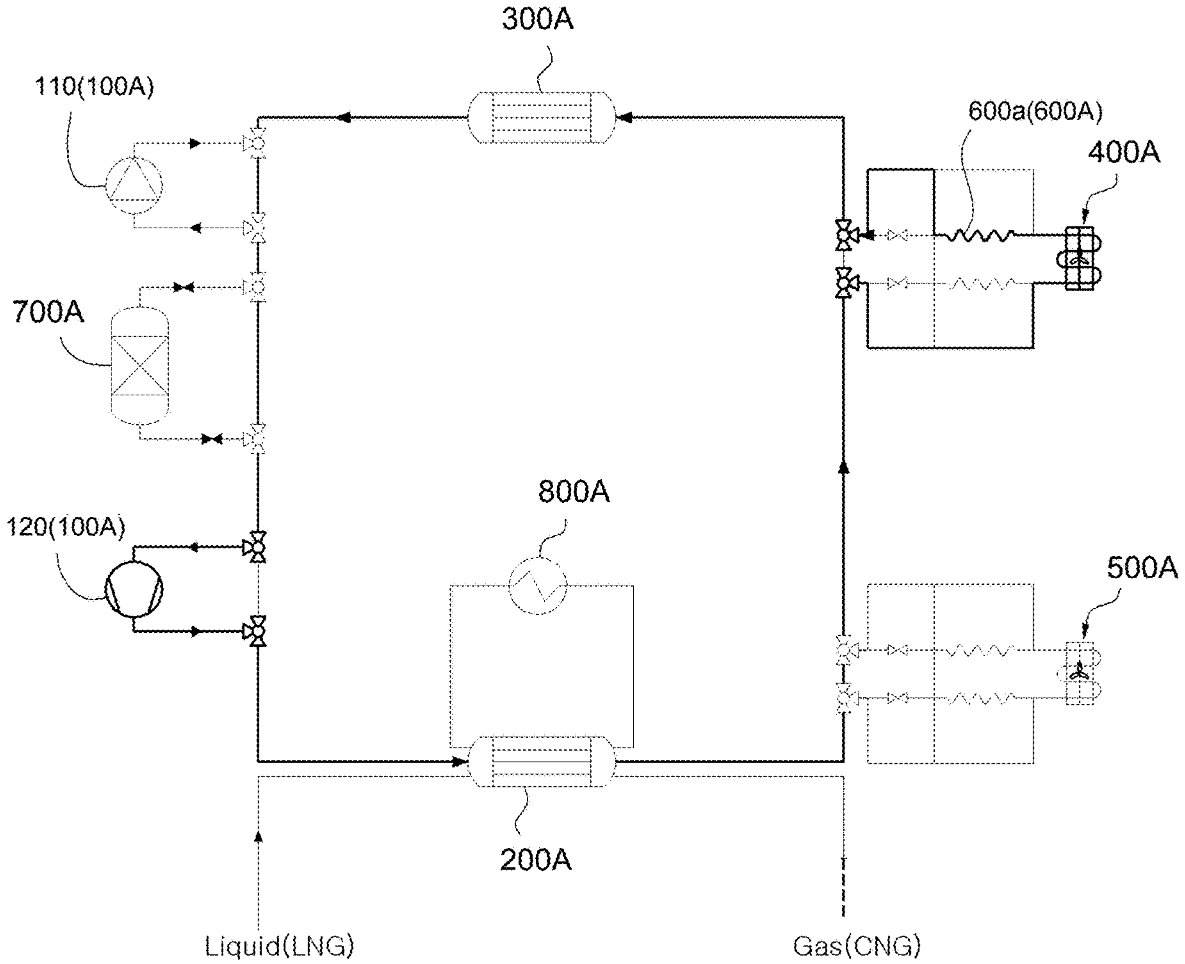
FIG. 36 is a diagram illustrating the operation process of a heat load control system according to the embodiment of the present invention when the cold-heat of the first medium and the heat of the second medium are the same.
Figure 37:
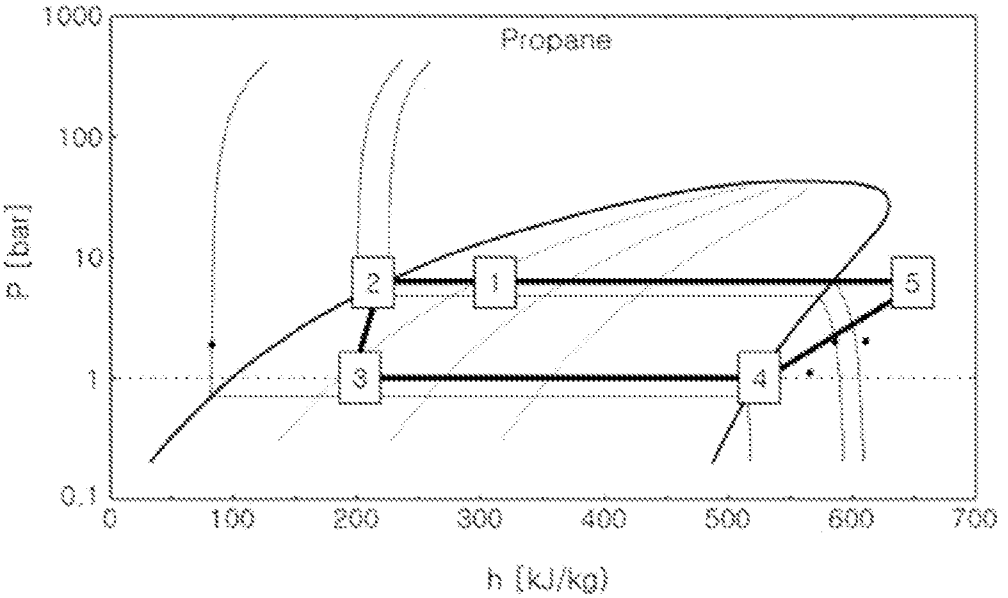
FIG. 37 is a P-h line diagram in the operation process of the heat load control system illustrated in FIG. 36.

FIG. 36 is a diagram illustrating an operation process of the heat load control system according to the embodiment of the present invention when the amount of cold-heat of a first medium and the amount of heat of a second medium are the same, and FIG. 37 is a P-h line diagram in the operation process of the heat load control system illustrated in FIG. 36.

A working fluid receives cold-heat from a first medium while passing through the first heat exchanger 200A, thereby decreasing in temperature (the temperature of the first medium increases). At this time, enthalpy decreases in the P-h line diagram and moves in a direction of a saturated liquid line (1 in FIG. 37). Thereafter, the working fluid dissipates heat while passing through the heat dissipation means 400A, thereby decreasing in temperature. At this time, the enthalpy decreases in the P-h line diagram and moves in the direction of the saturated liquid line (2 in FIG. 37). Thereafter, the working fluid may decrease in temperature and pressure while passing through the capillary tube 620*a* of the adjustment means 600A. At this time, both the pressure and the enthalpy decrease in the P-h line diagram (3 in FIG. 37). Thereafter, the working fluid receives heat from a second medium while passing through the second heat exchanger 300A, thereby increasing in temperature (the temperature of the second medium decreases).

At this time, the enthalpy increases in the P-h line diagram and moves in a direction of a saturated steam line (4 in FIG. 37). Thereafter, the working fluid increase in pressure and temperature while passing through the pressurized means 100A (the compressor 120). At this time, the pressure and the enthalpy increase in the P-h line diagram (5 in FIG. 37). Thereafter, the working fluid repeats the above-described process.

In the above-described process, when cold-heat of a first medium and heat of a second medium are the same, a balance of the amount of cold-heat of the first medium and the amount of heat of the second medium is maintained by using the heat dissipation means 400A, the capillary tube 620*a*, the compressor 120, and so on. In order for the working fluid to sufficiently absorb heat in the second heat exchanger 300A, the working fluid may decrease in temperature while passing through the first heat exchanger 200A and then passing through the heat dissipation means 400A and may decrease in temperature and pressure while passing through the capillary tube 620*a*.

Figure 38:
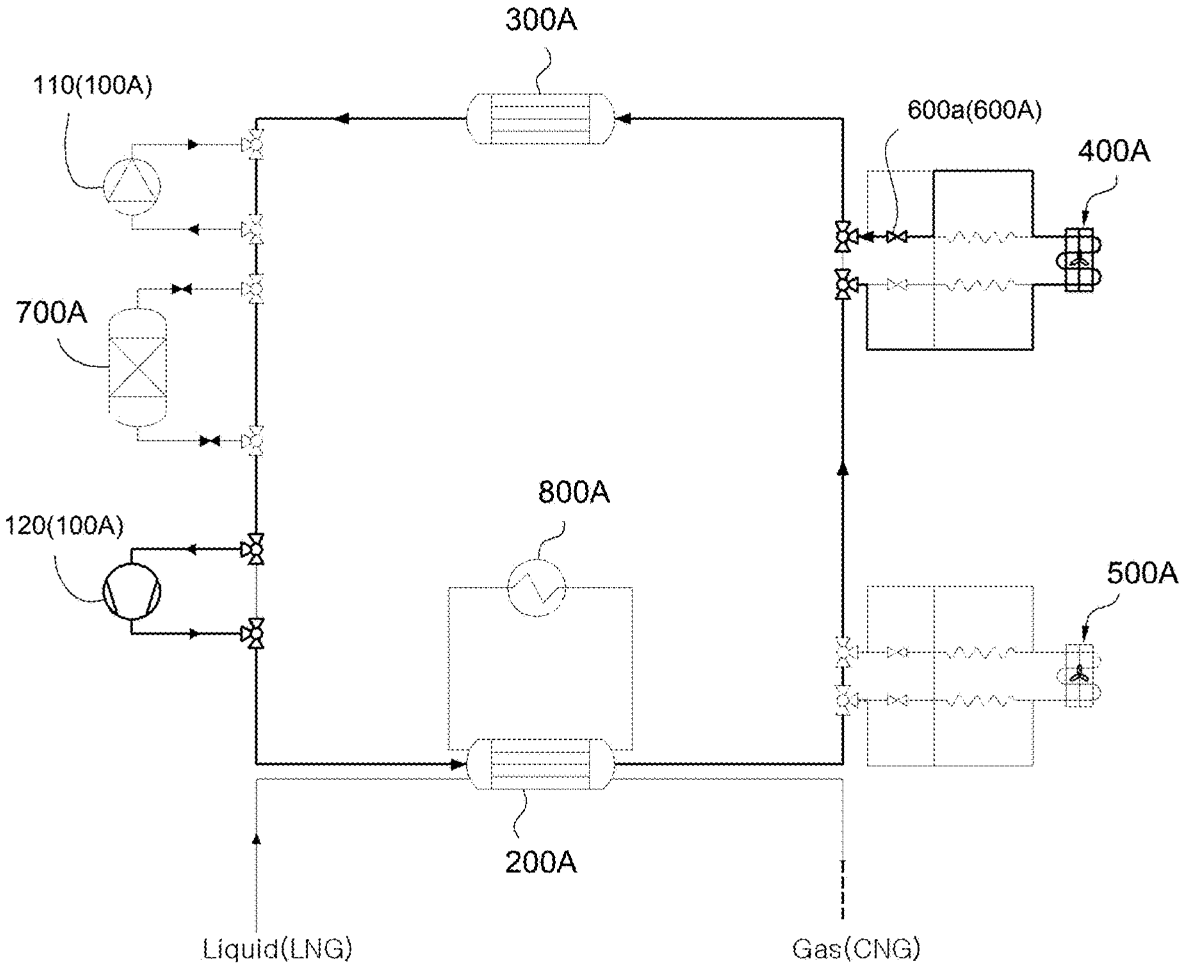
FIG. 38 is a diagram illustrating an operation process of a heat load control system according to the embodiment of the present invention when the cold-heat of the first medium and the heat of the second medium are the same.
Figure 39:
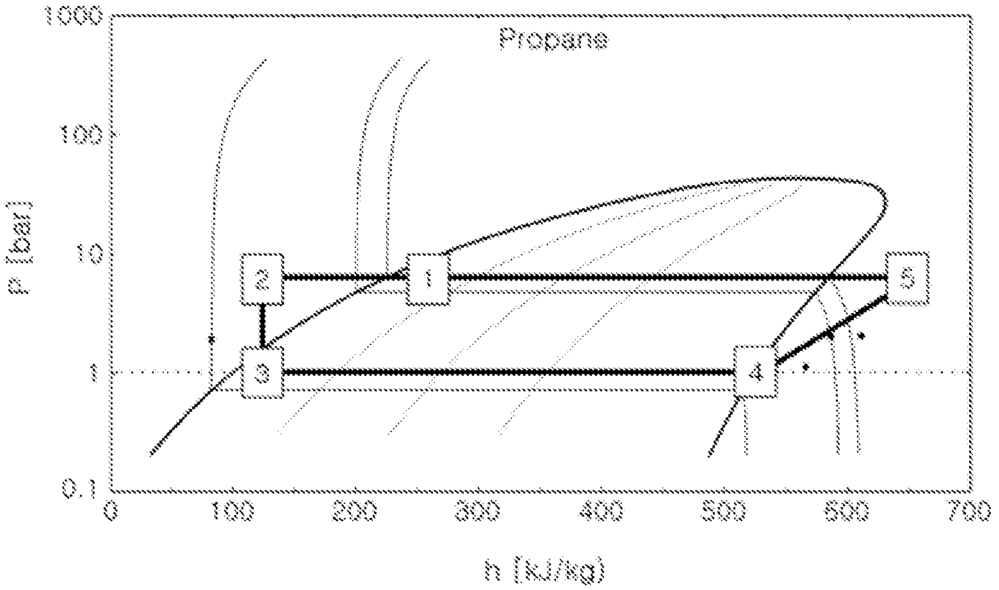
FIG. 39 is a P-h line diagram in the operation process of the heat load control system illustrated in FIG. 38.

FIG. 38 is a diagram illustrating an operation process of the heat load control system according to the embodiment of the present invention when the amount of cold-heat of a first medium and the amount of heat of a second medium are the same, and FIG. 39 is a P-h line diagram in the operation process of the heat load control system illustrated in FIG. 38.

A working fluid receives cold-heat from a first medium while passing through the first heat exchanger 200A, thereby decreasing in temperature (the temperature of the first medium increases). At this time, enthalpy decreases in the P-h line diagram and moves in a direction of a saturated liquid line (1 in FIG. 39). Thereafter, the working fluid dissipates heat while passing through the heat dissipation means 400A, thereby decreasing in temperature. At this time, the enthalpy decreases in the P-h line diagram and passes through the saturated liquid line (2 in FIG. 39). Thereafter, the working fluid may decrease in pressure while passing through the expansion valve 610*a* of the adjustment means 600A. At this time, the pressure decreases in the P-h line diagram (3 in FIG. 39). Thereafter, the working fluid receives heat from a second medium while passing through the second heat exchanger 300A, thereby increasing in temperature (the temperature of the second medium decreases). At this time, the enthalpy increases in the P-h line diagram and moves in a direction of a saturated steam line (4 in FIG. 39). Thereafter, the working fluid increases in pressure and temperature while passing through the pressurized means 100A (the compressor 120). At this time, the pressure and the enthalpy increase in the P-h line diagram (5 in FIG. 39). Thereafter, the working fluid repeats the above-described process.

In the above-described process, when the amount of cold-heat of a first medium and the amount of heat of a second medium are the same, a balance of the amount of cold-heat of the first medium and the amount of heat of the second medium is maintained by using the heat dissipation means 400A, the compressor 120, and so on. In order for the working fluid to sufficiently absorb heat in the second heat exchanger 300A, the working fluid may decrease in temperature while passing through the first heat exchanger 200A and then passing through the heat dissipation means 400A so as to be cooled in a liquid state, and then may decrease in only pressure without a decrease in temperature while passing through the expansion valve 610*a*.

Meanwhile, the heat load control system according to the present invention has an advantage in that stable heat exchange is made because of the operation in a region adjacent to a saturated liquid line and a saturated steam line on a P-h line diagram as described above.

Figure 40:
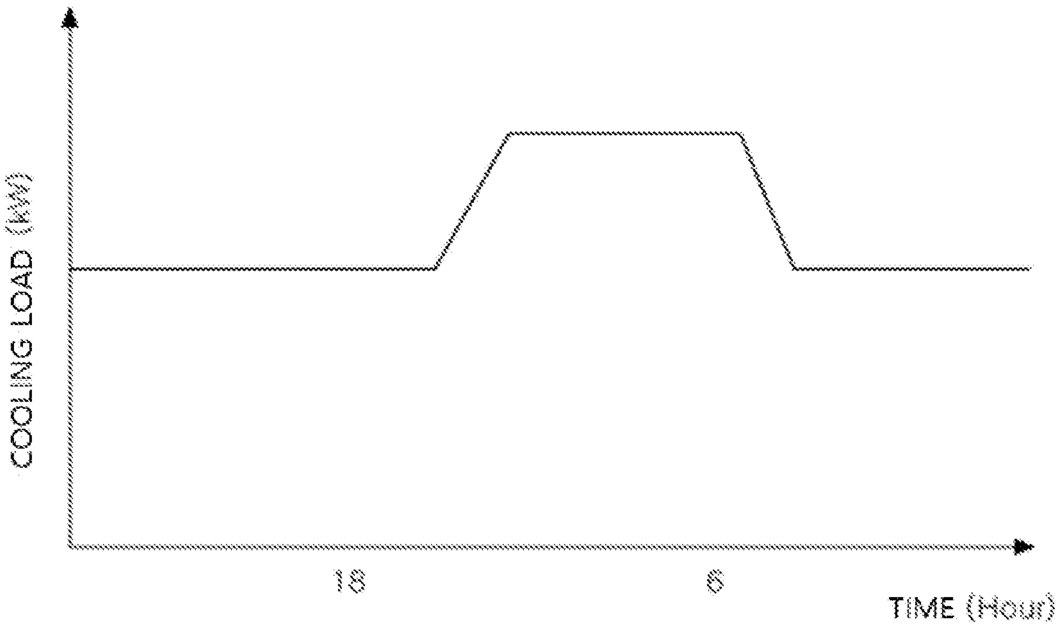
FIG. 40 is a graph of cooling load characteristics of the first medium over time.
Figure 41:
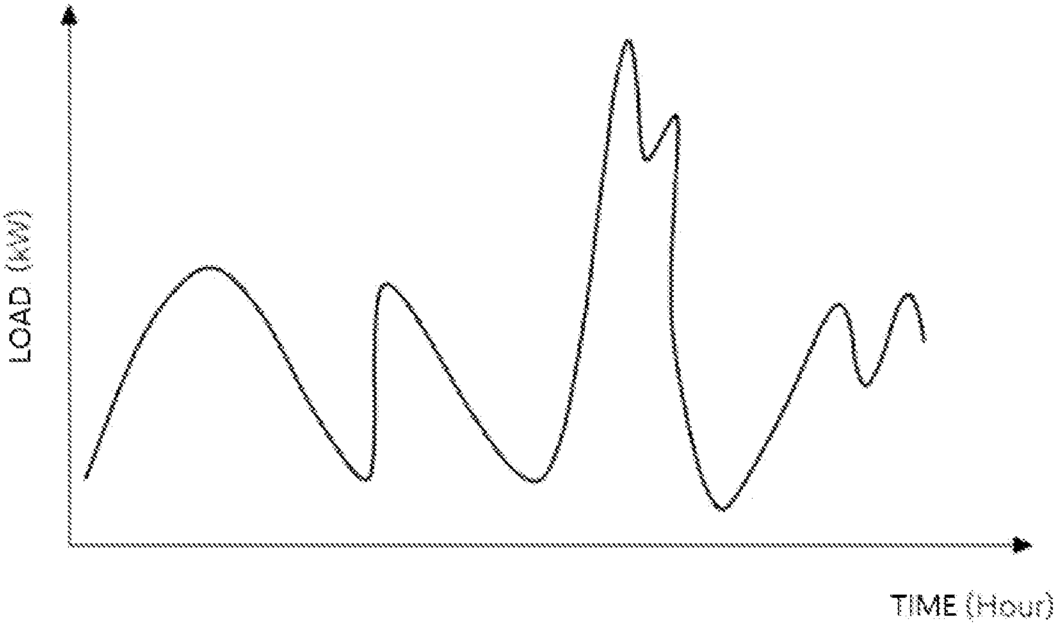
FIG. 41 is a graph of load characteristics of the second medium over time.
Figure 42:
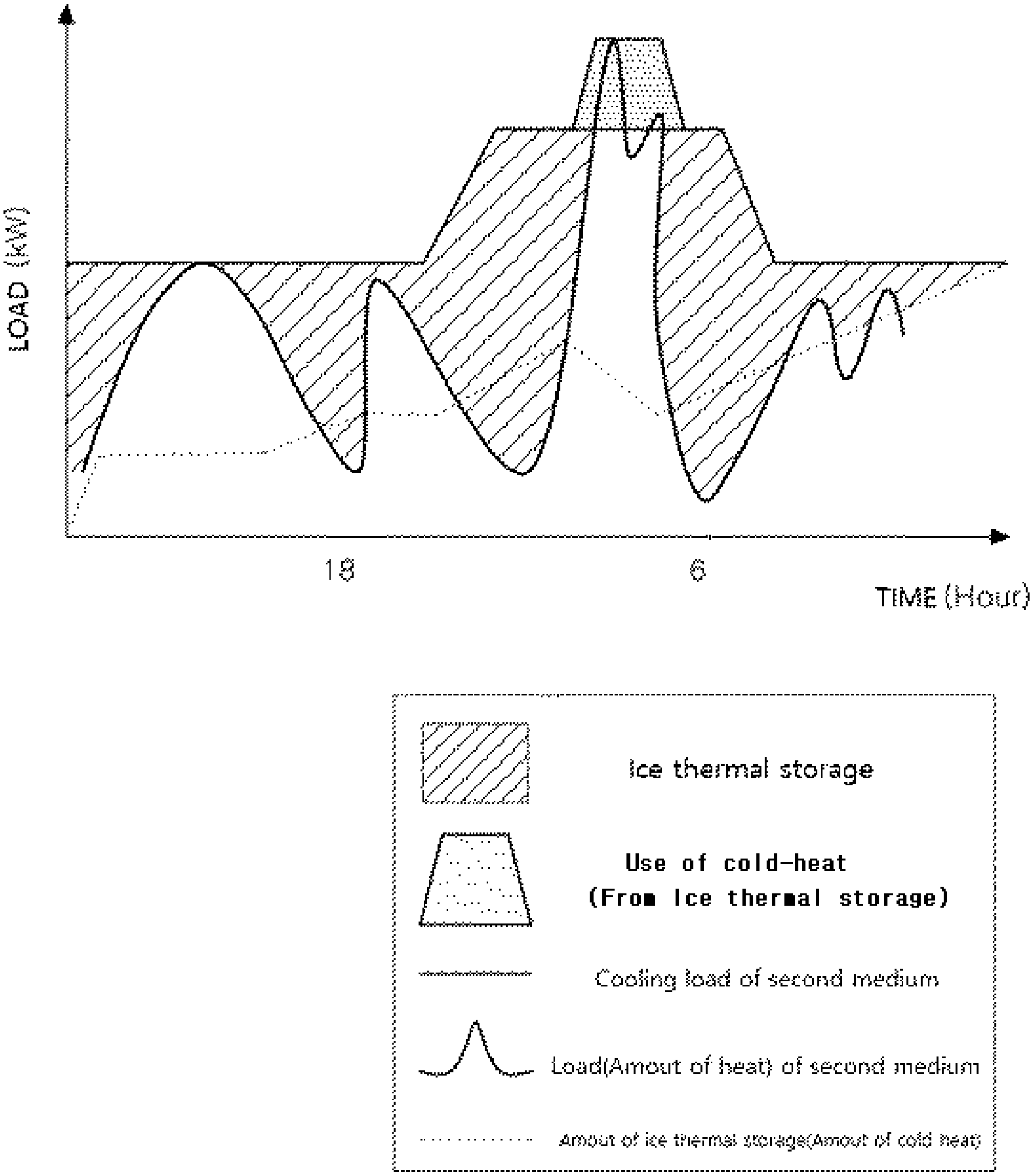
FIG. 42 is a graph of load leveling characteristics over time according to the heat load control system of the embodiment of the present invention.

FIG. 40 is a graph of cooling load characteristics of a first medium over time, FIG. 41 is a graph of load characteristics of a second medium over time, and FIG. 42 is a graph of load leveling characteristics over time according to the heat load control system of the embodiment of the present invention. How the heat load control system according to the present invention actually absorbs a difference in the amount of heat between two heat sources will be described with reference to FIGS. 40 to 43.

As illustrated in FIG. 40, a cooling load of a first medium (liquefied natural gas) is highly related to the amount of vaporization (the amount of use of the liquefied natural gas). For example, the amount of Liquified Natural Gas use at night time is greater than the amount of use at day time, and thus, a cooling load at night time is greater than a cooling load at day time. Similarly, the amount of use in winter is greater than the amount of use in summer, and thus, a cooling load in winter is greater than a cooling load in summer. As such, the cooling load of the first medium (liquefied natural gas) has characteristics that may be predicted by time/season.

As illustrated in FIG. 41, a load of a second medium (waste heat of a data center, waste heat of a shopping mall, or so on) is difficult to predict the amount of data use by season, and is affected to some extent by time zones, events (for example, a black Friday event, confirmation of a successful applicant, and so on), or so on, but this is also not accurate, and thus, the load has characteristics that may not be practically predicted by time/season.

As a result, there is a need to absorb a difference in the amount of heat between the cooling load of the first medium (liquefied natural gas) that may be predicted and the load of the second medium (waste heat of a data center, waste heat of a shopping mall, or so on) that may not be predicted, and the heat load control system according to the embodiment of the present invention may absorb the difference in the amount of heat described above by using, for example, the ice thermal storage system 700A.

FIG. 42, when a cooling load of a first medium (liquefied natural gas) is greater than a load of a second medium (waste heat of a data center, waste heat of a shopping mall, or so on), the ice thermal storage system 700A stores cold-heat (absorbs cold-heat from a working fluid). At this time, the cold-heat amount of ice thermal storage (amount of cold-heat) of the ice thermal storage system 700A increases. In addition, when the cooling load of the first medium (liquefied natural gas) is the same as the load of the second medium (waste heat of a data center, waste heat of a shopping mall, or so on), the ice thermal storage system 700A does not operate. In addition, when the cooling load of the first medium (liquefied natural gas) is less than the load of the second medium (waste heat of a data center, waste heat of a shopping mall, or so on), the ice thermal storage system 700A uses the ice-heat (supplies cold-heat to the working fluid)). At this time, the amount of ice-heat (amount of cold-heat) of the ice thermal storage system 700A is reduced. As described above, the heat load control system according to the present invention absorbs a difference in the amount of heat between two heat sources by using the ice thermal storage system 700A, thereby preventing occurrence of mismatch in a load of the heat exchange system due to the difference in heat. In addition, the ice thermal storage system 700A may supply cold-heat to the working fluid even in an emergency, and thus, there is an advantage in that heat exchange process may be made between the two heat sources even in an emergency.

Although the present invention is described in detail through specific examples, this is for the purpose of describing the present invention in detail, and the present invention is not limited thereto, and it is apparent that modifications or improvements may be made by those skilled in the art within the technical idea of the present invention.

All simple modifications or changes of the present invention belong to the scope of the present invention, and the specific protection scope of the present invention will be made clear by the appended claims.

The invention claimed is:

1. A heat load control system comprising:

pressurized means for pressurizing a working fluid, wherein the pressurized means includes a pump and a compressor;

a first heat exchanger that causes the working fluid to exchange heat with a first medium comprising liquefied natural gas (LNG) and transfers heat of the first medium to the working fluid;

a second heat exchanger that causes the working fluid to exchange heat with a second medium and transfers heat of the second medium to the working fluid;

heat dissipation means provided between the first heat exchanger and the second heat exchanger to dissipate heat from the working fluid;

heat supply means provided between the first heat exchanger and the second heat exchanger to supply heat to the working fluid;

adjustment means provided between the first heat exchanger and the second heat exchanger to decrease a temperature and a pressure of the working fluid, the adjustment means including first to fourth adjustment means, each of the first to fourth adjustment means comprising a respective expansion valve and a respective capillary tube, the respective expansion valve and the respective capillary tube of each of the first to fourth adjustment means being disposed together in a corresponding one of first to fourth auxiliary lines;

an ice thermal storage provided between the first heat exchanger and the second heat exchanger to supply heat to the working fluid or to absorb heat from the working fluid; and a heater connected to the first heat exchanger to supply heat to the working fluid, wherein each of the heat dissipation means and the heat supply means include:

a plurality of plate portions arranged side by side, each being formed in a flat plate shape;

a tube which extends in one direction to penetrate the plurality of plate portions, is bent, and then extends in another direction to penetrate the plurality of plate portions, through which the working fluid passes; and a fan configured to induce forced convection, wherein the heat dissipation means is connected to the first auxiliary line and the second auxiliary line, the first auxiliary line and the second auxiliary line being branched from a main line connecting the first heat exchanger to the second heat exchanger, and the heat supply means is connected to the third auxiliary line and the fourth auxiliary line, the third auxiliary line and the fourth auxiliary line being branched from the main line, the first auxiliary line connecting an inlet side and the second auxiliary line connecting an outlet side of the heat dissipation means to the main line, and the third auxiliary line connecting an inlet side and the fourth auxiliary line connecting an outlet side of the heat supply means to the main line, wherein a diameter of the tube of the heat supply means is larger than a diameter of the tube of the heat dissipation means through which the working fluid passes.

2. The heat load control system of claim 1, wherein each respective expansion valve of the first to fourth adjustment means decreases a pressure of the working fluid; and each respective capillary tube of the first to fourth adjustment means decreases a temperature and a pressure of the working fluid.

3. The heat load control system of claim 1, wherein the working fluid selectively passes through at least one of the heat dissipation means, the heat supply means, at least one of the first to fourth adjustment means of the adjustment means, and the ice thermal storage.

4. The heat load control system of claim 1, wherein the second medium is a fluid or seawater that receives heat from waste heat of a factory, waste heat of a garbage disposal site, waste heat of a data center, or waste heat of a shopping mall, and wherein the second medium supplies heat to the working fluid in the second heat exchanger.

5. The heat load control system of claim 1, wherein the heater is an electric heater, a gas boiler using BOG (Boil Off Gas), or a heater using waste heat of a data center.

6. The heat load control system of claim 1, wherein, when the heat of the first medium is greater than the heat of the second medium by a first predetermined value, the ice thermal storage absorbs the heat from the working fluid, or the heat supply means supplies heat to the working fluid, when a second predetermined value is greater than the first predetermined value, in a case where the heat of the first medium is greater than the heat of the second medium by the second predetermined value, the heater supplies heat to the working fluid, when a third predetermined value is greater than the second predetermined value, in a case where the heat of the first medium is greater than the heat of the second medium by the third predetermined value, the heat supply means supplies heat to the working fluid, and the heater supplies heat to the working fluid, and when a fourth predetermined value is greater than the third predetermined value, in a case where the heat of the first medium is greater than the heat of the second medium by the fourth predetermined value, the ice thermal storage absorbs heat from the working fluid, the heat supply means supplies heat to the working fluid, and the heater supplies heat to the working fluid.

7. The heat load control system of claim 6, wherein, when the heat of the second medium is greater than the heat of the first medium by a fifth predetermined value, the ice thermal storage supplies heat to the working fluid, or the heat dissipation means dissipates heat from the working fluid, and when a sixth predetermined value is greater than the fifth predetermined value, in a case where the heat of the second medium is greater than the heat of the first medium by the sixth predetermined value, the ice thermal storage supplies heat to the working fluid, and the heat dissipation means dissipates heat from the working fluid.

* * * * *